United States Patent
Li

(10) Patent No.: US 11,668,854 B2
(45) Date of Patent: Jun. 6, 2023

(54) FORECASTING HYDROCARBON PRODUCTION

(71) Applicant: Chevron U.S.A. Inc., San Ramon, CA (US)

(72) Inventor: Boxiao Li, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 727 days.

(21) Appl. No.: 16/601,651

(22) Filed: Oct. 15, 2019

(65) Prior Publication Data

US 2021/0109252 A1    Apr. 15, 2021

(51) Int. Cl.
*G01V 99/00*    (2009.01)
*G06N 20/00*    (2019.01)
*G06Q 10/04*    (2023.01)

(52) U.S. Cl.
CPC ........... *G01V 99/005* (2013.01); *G06N 20/00* (2019.01); *G06Q 10/04* (2013.01); *E21B 2200/20* (2020.05)

(58) Field of Classification Search
CPC ...... G01V 99/005; G06N 20/00; G06N 5/003; G06Q 10/04; E21B 2200/20; E21B 33/00
See application file for complete search history.

(56) References Cited

U.S. PATENT DOCUMENTS

| | | | |
|---|---|---|---|
| 4,973,811 A | 11/1990 | Bass | |
| 5,229,583 A | 7/1993 | van Egmond et al. | |
| 6,002,985 A | 12/1999 | Stephenson | |
| 6,901,391 B2 | 5/2005 | Storm, Jr. et al. | |
| 7,899,657 B2 | 3/2011 | Martin | |
| 8,046,314 B2 | 10/2011 | Graf et al. | |
| 8,192,591 B2 | 6/2012 | Zaikin et al. | |
| 8,775,361 B2 | 7/2014 | Goel et al. | |
| 9,399,901 B2 | 7/2016 | Poe | |
| 9,539,455 B2 | 1/2017 | Hoelen et al. | |
| 9,910,938 B2 | 3/2018 | Morales German et al. | |
| 10,012,056 B1 | 7/2018 | Lapierre | |
| 10,012,748 B2 | 7/2018 | Gupta et al. | |
| 10,260,319 B2 | 4/2019 | Sarduy et al. | |

(Continued)

FOREIGN PATENT DOCUMENTS

| | | |
|---|---|---|
| EP | 3414428 | 12/2018 |
| WO | 2017188858 A1 | 11/2017 |

OTHER PUBLICATIONS

Singh et al. "A Review of Supervised Machine Learning Algorithms" 2016 (Year: 2016).*

(Continued)

*Primary Examiner* — Rehana Perveen
*Assistant Examiner* — Troy A Maust

(57) ABSTRACT

Embodiments of forecasting hydrocarbon production are provided. One embodiment comprises transforming production data of a plurality of training wellbores and production data of at least one target wellbore such that the production data for all training wellbores and target wellbores are equivalent at the end of a first period of time; generating a transformed production forecast for each target wellbore at a target forecast time responsive to the transformed production data; and back transforming the transformed production forecast for each target wellbore to remove the equivalency. The back transformed production forecast for each target wellbore is the final production forecast for each target wellbore.

24 Claims, 12 Drawing Sheets

(56) References Cited

U.S. PATENT DOCUMENTS

| | | |
|---|---|---|
| 10,859,725 B2 | 12/2020 | Dupont et al. |
| 2017/0364795 A1 | 12/2017 | Anderson et al. |
| 2018/0060454 A1 | 3/2018 | Bashore |
| 2018/0188403 A1 | 7/2018 | Halsey et al. |
| 2018/0202264 A1 | 7/2018 | Sarduy et al. |
| 2018/0240021 A1 | 8/2018 | Al-Harbi et al. |
| 2018/0293336 A1 | 10/2018 | Tao |
| 2018/0335538 A1* | 11/2018 | Dupont ............... G06Q 10/04 |
| 2019/0024494 A1* | 1/2019 | Maher .................. E21B 44/00 |

OTHER PUBLICATIONS

Bandura, Laura, et al.; "Machine Learning in the Interpreter's Toolbox: Unsupervised, Supervised, and Deep Learning Applications"; (2018), SEG International Exposition and 88th Annual Meeting, pp. 4633-4637.

Fekete; "Traditional Decline Analysis Theory"; http://www.fekete.com/san/webhelp/feketeharmony/harmony_webhelp/content/html_files/reference_material/analysis_method_theory/Traditional_Decline_Theory.htm, 11 pages.

He, Jiabo, et al.; "Data-Driven In-Situ Sonic-Log Synthesis in Shale Reservoirs for Geomechanical Characterization"; (2019), SPE Reservoir Evaluation & Engineering, pp. 1-15.

James, Gareth; et al.; "An Introduction to Statistical Learning with Applications in R"; Springer, (2013), title pages (2), Preface (p. vii-viii), Table of Contents (pp. ix-xi), Introduction (pp. 1-14), Section 5.1.3 (pp. 181-183).

Schmidhuber, Jurgen; "Deep Learning in Neural Networks: An Overview"; (2015), Neural Networks, vol. 61, pp. 85-117.

Schuetter, Jared, et al.; "A Data-Analytics Tutorial: Building Predictive Models for Oil Production in an Unconventional Shale Reservoir"; (2018), SPE Journal, pp. 1075-1089.

Zhong, Ming, et al.; "Do Data Mining Methods Matter? : A Wolfcamp "Shale" Case Study"; (2015), SPE-173334-MS, pp. 1-12.

Amr, Salma, et al.; "A Large-Scale Study for a Multi-Basin Machine Learning Model Predicting Horizontal Well Production"; SPE-191538-MS, (2018), SPE Technical Conference and Exhibition, pp. 1-15.

Arps, J.J.; "Analysis of Decline Curves"; (1945), Transactions of the AIME, vol. 160(01), pp. 228-247.

Boser, J.J., et al.; "A Training Algorithm for Optimal Margin Classifiers"; (1992), In Proceedings of the Fifth Annual Workshop on Computational Learning Theory, pp. 144-152.

Breiman, Leo; "Random Forests"; (2001), Machine Learning, vol. 45, pp. 5-32.

Cao, Q., et al.; "Data Driven Production Forecasting Using Machine Learning"; (2016), SPE-180984-MS, pp. 1-10.

Duong, A.N.; "An Unconventional Rate Decline Approach for Tight and Fracture-Dominated Gas Wells"; (2010), CSUG/SPE 137748, pp. 1-15.

Friedman, Jerome H.; "Greedy Function Approximation: A Gradient Boosting Machine"; (2001), The Annals of Statistics, vol. 29, No. 5, pp. 1189-1232.

Robertson, S.; "Generalized Hyperbolic Equation"; SPE 18731, (1988), 1-16, 3 drawing sheets.

Valko, Peter P., et al.; "A Better Way to Forecast Production from Unconventional Gas Wells"; (2010), SPE 134231, pp. 1-16.

Vyas, Aditya, et al.; "Modeling Early Time Rate Decline in Unconventional Reservoirs Using Machine Learning Techniques"; (2017), SPE-188231-MS, pp. 1-23.

Boxiao, Li, et al.; "Rescaling Method for Improved Machine-Learning Decline Curve Analysis for Unconventional Reservoirs"; SPE 205349, (Jul. 2020), pp. 1759-1772, Aug. 2021 SPE Journal.

Boxiao, Li, et al.; "Significant Error Reduction in Machine-Learning Decline Curve Analysis for Unconventional Reservoirs"; (Jul. 2020), URTeC: 2106, pp.

* cited by examiner

| | Predictor variables | | | | | | | | | | | | | | Response variable |
|---|---|---|---|---|---|---|---|---|---|---|---|---|---|---|---|---|
| | Scaled cumulative production at month 1, 2, ..., 11 | | | Cumulative production at month 12 | Geographic properties | | | | Geologic properties | Wellbore properties | Completion properties | | | | Scaled cumulative production at month 36 |
| well_ID | scaled cum_oil_1 | scaled cum_oil_2 | ... | scaled cum_oil_11 | cum_oil_12 | x_heel | y_heel | depth | azimuth | formation_ID | ... | tortuosity | ... | perforated length | proppant intensity | fracking fluid intensity | ... | scaled cum_oil_36 |
| xxx | 0.1505 | 0.2892 | ... | 0.9364 | 73796 | 869133 | 946063 | 9877 | 174 | xxx | ... | 0.99926 | ... | 4320 | 861 | 730 | ... | 2.1032 |
| xxx | 0.1570 | 0.3157 | ... | 0.9769 | 81490 | 877671 | 898328 | 10429 | 358 | xxx | ... | 0.99977 | ... | 4035 | 1074 | 1019 | ... | 1.6343 |
| xxx | 0.1415 | 0.2734 | ... | 0.9439 | 84036 | 917010 | 990234 | 11094 | 267 | xxx | ... | 0.99972 | ... | 6990 | 528 | 422 | ... | 1.8193 |
| xxx | 0.1989 | 0.3783 | ... | 0.9766 | 56012 | 1014079 | 926998 | 12453 | 357 | xxx | ... | 0.99910 | ... | 2295 | 1205 | 1079 | ... | 1.6795 |
| xxx | 0.1276 | 0.2462 | ... | 0.9414 | 24110 | 1015658 | 1085406 | 10873 | 85 | xxx | ... | 0.99979 | ... | 3759 | 329 | 235 | ... | 2.0498 |
| xxx | 0.2008 | 0.3188 | ... | 0.9771 | 37061 | 1015647 | 1089434 | 10895 | 88 | xxx | ... | 0.99972 | ... | 4292 | 271 | 213 | ... | 1.7000 |
| xxx | 0.2713 | 0.4222 | ... | 0.9676 | 120964 | 1015722 | 1050634 | 11528 | 267 | xxx | ... | 0.99972 | ... | 4290 | 769 | 681 | ... | 1.4954 |
| xxx | 0.1417 | 0.2461 | ... | 0.9495 | 84207 | 1012702 | 1060432 | 11158 | 174 | xxx | ... | 0.99950 | ... | 3953 | 519 | 339 | ... | 1.7915 |
| xxx | 0.1406 | 0.2669 | ... | 0.9615 | 114825 | 1015750 | 1081989 | 10917 | 357 | xxx | ... | 0.99971 | ... | 4011 | 660 | 511 | ... | 1.8558 |
| xxx | 0.1793 | 0.3452 | ... | 0.9575 | 145436 | 1018568 | 1113377 | 10670 | 178 | xxx | ... | 0.99984 | ... | 4009 | 843 | 738 | ... | 1.5858 |
| xxx | 0.2339 | 0.3712 | ... | 0.9375 | 19303 | 1027015 | 1044372 | 11659 | 178 | xxx | ... | 0.99982 | ... | 4299 | 855 | 744 | ... | 1.7925 |
| xxx | 0.2349 | 0.4697 | ... | 0.9637 | 125003 | 1015530 | 1060508 | 11137 | 178 | xxx | ... | 0.99965 | ... | 4260 | 580 | 388 | ... | 1.5979 |
| xxx | 0.1705 | 0.3397 | ... | 0.9684 | 163298 | 1012609 | 1066096 | 11082 | 357 | xxx | ... | 0.99980 | ... | 4341 | 502 | 329 | ... | 1.5209 |
| xxx | 0.2353 | 0.4116 | ... | 0.9617 | 54275 | 1015489 | 1049270 | 11514 | 270 | xxx | ... | 0.99934 | ... | 4168 | 842 | 634 | ... | 1.5920 |
| xxx | 0.1852 | 0.3245 | ... | 0.9577 | 61319 | 1025444 | 1053361 | 11752 | 356 | xxx | ... | 0.99959 | ... | 4296 | 731 | 599 | ... | 1.7069 |
| ... | ... | ... | ... | ... | ... | ... | ... | ... | ... | ... | ... | ... | ... | ... | ... | ... | ... | ... |
| xxx | 0.1305 | 0.2451 | ... | 0.9404 | 157054 | 933654 | 869102 | 11607 | 358 | xxx | ... | 0.99961 | ... | 6555 | 1097 | 1058 | ... | |
| xxx | 0.1873 | 0.3463 | ... | 0.9609 | 100837 | 810966 | 879004 | 9129 | 177 | xxx | ... | 0.99974 | ... | 4437 | 1411 | 1331 | ... | |
| xxx | 0.1723 | 0.2817 | ... | 0.9365 | 145207 | 1018743 | 1092111 | 10870 | 178 | xxx | ... | 0.99971 | ... | 4247 | 644 | 614 | ... | |

Training wells (upper section); Target wells (lower section); To be predicted.

Fig. 5

FORECASTING HYDROCARBON PRODUCTION

CROSS REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates to forecasting hydrocarbon production.

BACKGROUND

The hydrocarbon industry recovers hydrocarbons that are trapped in subsurface reservoirs (also known as subsurface formations). The hydrocarbons can be recovered by drilling wellbores (also known as wells) into the reservoirs and the hydrocarbons are able to flow from the reservoirs into the wellbores and up to the surface. Operation and management of hydrocarbon reservoirs typically rely on production forecasts of the wellbores to enable better development planning, economic outlook, reserve estimates, and business decisions such as trading and pricing strategies.

A methodology called Decline Curve Analysis (DCA) has been widely applied in production forecasting of wellbores in hydrocarbon reservoirs, and many DCA models are available for use. However, traditional DCA falls short of forecast accuracy due to three weaknesses: first, it cannot capture the reservoir signals not modeled by the underlying DCA model formula; second, when predicting the production of particular wellbores, the production history of other wellbores in the geologic formation, which is valuable information, are not considered; and third, the wellbores' geographic, geologic, wellbore, and completion properties, which are highly relevant to production capability, are not utilized.

More recent methods have begun replacing traditional DCA with multivariate regression and machine-learning methods for production forecasting. Nevertheless, these recent methods may still be sub-optimal in correlating noisy historical production data with future production. These recent methods may also be ineffective in detecting similar production trends in different wellbores. Thus, these recent methods may lead to inconsistent and inaccurate forecast results with large bias and large standard deviation and skewness of error.

Thus, there exists a need in the area of production forecasting, and more particularly, to generating an improved production forecast of a wellbore that captures the production trend consistently and effectively, allowing for improved forecast accuracy.

SUMMARY

Embodiments of forecasting hydrocarbon production are provided herein. One embodiment of a method of forecasting hydrocarbon production comprises obtaining data of at least one target wellbore comprising production data of the at least one target wellbore for a first period of time; and obtaining data of a plurality of training wellbores comprising production data of the plurality of training wellbores for a second period of time. The second period of time is longer than the first period of time, and the second period of time comprises the first period of time and a target forecast time. The embodiment of the method further comprises transforming the production data of the plurality of training wellbores and the production data of the at least one target wellbore such that the production data for all training wellbores and target wellbores are equivalent at the end of the first period of time; generating a transformed production forecast for each target wellbore at the target forecast time responsive to the transformed production data; and back transforming the transformed production forecast for each target wellbore to remove the equivalency. The back transformed production forecast for each target wellbore is the final production forecast for each target wellbore.

One embodiment of a system of forecasting hydrocarbon production comprises a processor and a memory communicatively connected to the processor, the memory storing computer-executable instructions which, when executed, cause the processor to perform obtaining data of at least one target wellbore comprising production data of the at least one target wellbore for a first period of time; and obtaining data of a plurality of training wellbores comprising production data of the plurality of training wellbores for a second period of time. The second period of time is longer than the first period of time, and wherein the second period of time comprises the first period of time and a target forecast time. The embodiment of the system further comprises transforming the production data of the plurality of training wellbores and the production data of the at least one target wellbore such that the production data for all training wellbores and target wellbores are equivalent at the end of the first period of time; generating a transformed production forecast for each target wellbore at the target forecast time responsive to the transformed production data; and back transforming the transformed production forecast for each target wellbore to remove the equivalency. The back transformed production forecast for each target wellbore is the final production forecast for each target wellbore.

One embodiment of a computer readable storage medium having computer-executable instructions stored thereon which, when executed by a computer, cause the computer to perform a method of forecasting hydrocarbon production comprises obtaining data of at least one target wellbore comprising production data of the at least one target wellbore for a first period of time; and obtaining data of a plurality of training wellbores comprising production data of the plurality of training wellbores for a second period of time. The second period of time is longer than the first period of time, and the second period of time comprises the first period of time and a target forecast time. The embodiment of the computer readable storage medium further comprises transforming the production data of the plurality of training wellbores and the production data of the at least one target wellbore such that the production data for all training wellbores and target wellbores are equivalent at the end of the first period of time; generating a transformed production forecast for each target wellbore at the target forecast time responsive to the transformed production data; and back transforming the transformed production forecast for each target wellbore to remove the equivalency. The back transformed production forecast for each target wellbore is the final production forecast for each target wellbore.

DESCRIPTION OF THE DRAWINGS

FIG. 5 illustrates the application of one embodiment a Dynamic Production Rescaling (DPR) transformation algorithm on the example data of FIG. 4 in the running example.

Figure 1:
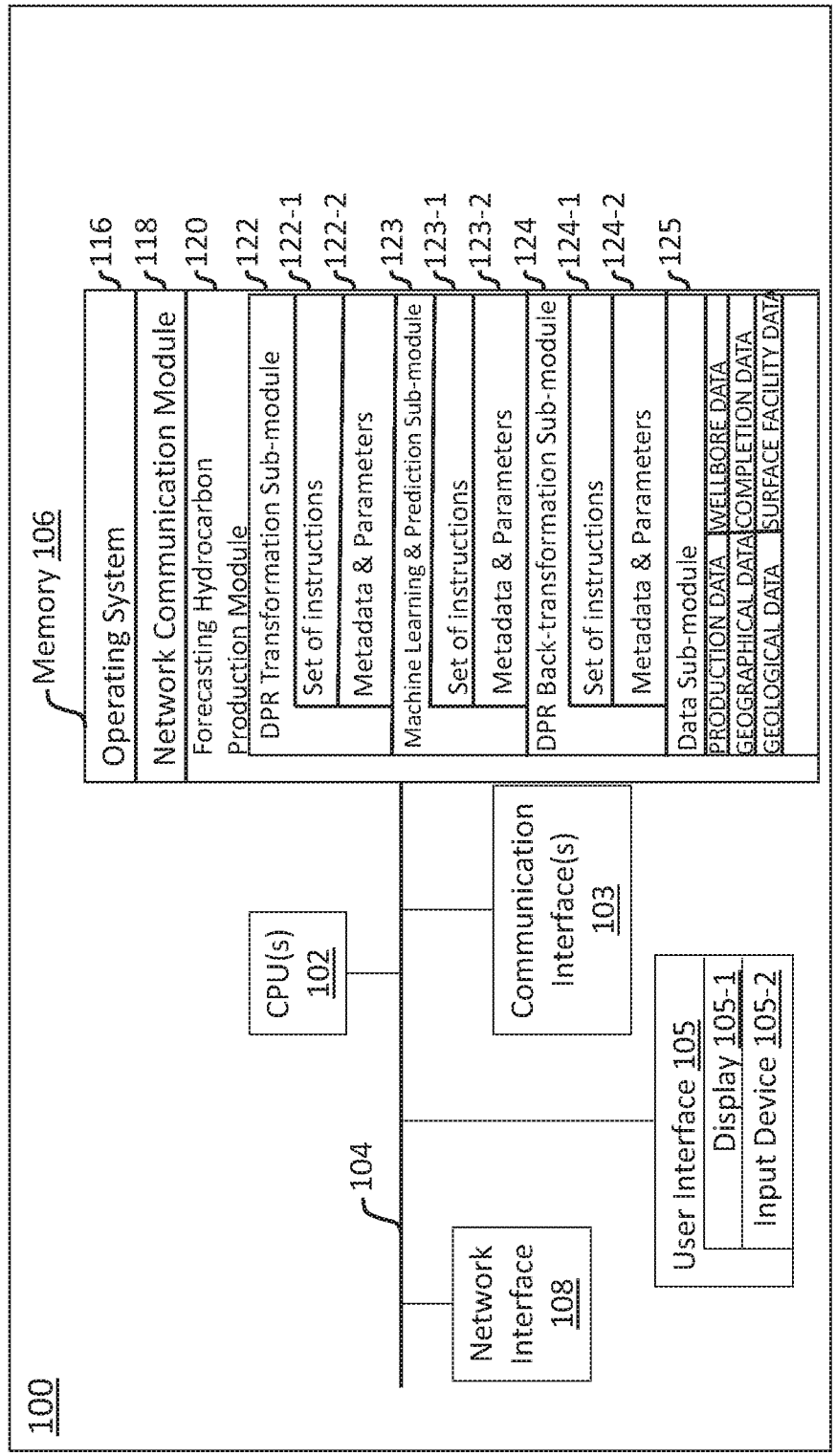
FIG. 1 illustrates one embodiment of a system of forecasting hydrocarbon production.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons and gas hydrocarbons) (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons are many, and hydrocarbons may include oil, natural gas, kerogen, bitumen, clathrates (also referred to as hydrates), etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a formation having a permeability in the range of from 0.000001 millidarcy to 25 millidarcy (such as an unconventional formation), a formation having a permeability in the range of from 26 millidarcy to 40,000 millidarcy, etc.

The terms "formation", "subsurface formation", "hydrocarbon-bearing formation", "reservoir", "subsurface reservoir", "subsurface region of interest", "subterranean reservoir", "subsurface volume of interest", "subterranean formation", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as production then injection, in some embodiments. The use of the wellbore may also be changed, for example, a particular wellbore may be turned into an injection wellbore after a different previous use as a production wellbore. The wellbore may be drilled amongst existing wellbores, for example, as an infill wellbore. A wellbore may be utilized for injection and a different wellbore may be used for hydrocarbon production, such as in the scenario that hydrocarbons are swept from at least one injection wellbore towards at least one production wellbore and up the at least one production wellbore towards the surface for processing. On the other hand, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards the bedding plane direction. A horizontal section of a wellbore may be, but is not limited to, a horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction.

The wellbore may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation. Enhanced oil recovery may also be referred to as tertiary oil recovery. Secondary recovery is sometimes just referred to as improved oil recovery or enhanced oil recovery. EOR processes include, but are not limited to, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer (AP) flooding, surfactant-polymer (SP) flooding, or alkaline-surfactant-polymer (ASP) flooding), (c) microbial injection, (d) thermal recovery (which includes, for example, cyclic steam and steam flooding), or any combination thereof. The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Another hydrocarbon recovery process(s) may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments. This is not an exhaustive list of hydrocarbon recovery processes.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of 10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

OVERVIEW: As discussed hereinabove, traditional Decline Curve Analysis (DCA) falls short of forecast accuracy due to three weaknesses: first, it cannot capture the reservoir signals not modeled by the underlying DCA model formula; second, when predicting the production of particular wellbores, the production history of other wellbores in the geologic formation, which is valuable information, are not considered; and third, the wellbores' geographic, geologic, wellbore, and completion properties, which are highly relevant to production capability, are not utilized. More recent methods have begun replacing traditional DCA with multivariate regression and machine-learning methods for production forecasting. Nevertheless, these recent methods may still be sub-optimal in correlating noisy historical production data with future production. These recent methods may also be ineffective in detecting similar production trends in different wellbores. Thus, these recent methods may lead to inconsistent and inaccurate forecast results with large bias and large standard deviation and skewness of error.

On the other hand, embodiments consistent with this disclosure rely on transforming production data of a plurality of training wellbores and production data of at least one target wellbore such that the production data for all training wellbores and target wellbores are equivalent at the end of a first period of time; generating a transformed production forecast for each target wellbore at a target forecast time responsive to the transformed production data; and back transforming the transformed production forecast for each target wellbore to remove the equivalency. The back transformed production forecast for each target wellbore is the final production forecast for each target wellbore. Embodiments of a Dynamic Production Rescaling (DPR) transformation algorithm and a DPR back-transformation algorithm are provided herein, and they may be utilized to generate the hydrocarbon production forecasts.

Advantageously, embodiments consistent with this disclosure allow the production trend to be captured consistently and effectively by a machine learning algorithm (e.g., a supervised machine learning algorithm), which may lead to more accurate production forecasts with small bias, small error standard deviation, and small error skewness. For example, up to 40% reduction (e.g., 1%-39%, 5%-35%, 5%-25%, 5%-15%, 10%-30%, or 15%-39%) of error and error band may be possible in some embodiments. Indeed, in the examples illustrated in FIGS. 7A-7D, 8A-8D, 9A-9D, 10A-10D, and 11A-11D, embodiments consistent with this disclosure yielded the best forecast accuracy. The more accurate production forecasts may enable better development planning, economic outlook, reserve estimates, and business decisions, reservoir management decisions (e.g., selection and execution of hydrocarbon recovery processes), especially for unconventional and tight rock reservoirs.

Advantageously, embodiments consistent with this disclosure may be utilized to generate short-term and long-term production forecasts based on historical production data and geographic, geologic, wellbore, completion data, and/or surface facility data, using a data transformation and predictive analytic approach that captures the production trend consistently and effectively, leading to accurate production forecasts with small bias, small error standard deviation, and small error skewness.

Advantageously, embodiments consistent with this disclosure may facilitate cross-functional integration of lots of types of data, including using data that is typically not used in forecasting. Increasing utilization of existing data across functions expands the value of each data/model generated.

Advantageously, embodiments consistent with this disclosure may be utilized to generate production forecasts for practically any type of hydrocarbon such as, but not limited to, oil production and gas production. Embodiments consistent with this disclosure may be utilized to generate production forecasts for practically any type of production such as, but not limited to, cumulative production and estimated ultimate recovery (EUR). The embodiments consistent with this disclosure may be utilized to forecast hydrocarbon production of a wellbore drilled in a conventional formation. The embodiments consistent with this disclosure may be utilized to forecast hydrocarbon production of a wellbore drilled in an unconventional formation.

Advantageously, embodiments consistent with this disclosure may lead to more accurate characterization of reserves, which may be utilized in the trading strategy.

Advantageously, embodiments consistent with this disclosure may lead to more accurate production forecasts, as indicated above, and the more accurate production forecasts may be used for early or preventative wellbore intervention, for example, if the more accurate forecast indicates a decline in production. The early or preventative wellbore intervention may include a workover, fix or replace equipment (e.g., pump, artificial lift), refracturing, change or adjust the hydrocarbon recovery process, etc.

Advantageously, embodiments consistent with this disclosure may be utilized to optimize productivity of a producing hydrocarbon bearing formation and drive reservoir management decisions. (1) As an example, embodiments consistent with this disclosure may be utilized to optimize well designs, including orientation of wellbores, drilling mud weight, casing points, completion designs, etc. (2) As an example, embodiments consistent with this disclosure may be utilized to identify azimuth, wellbore length, landing zone (depth), geosteering to follow the landing zone, etc. For example, higher producers and their associated depths may be identified and utilized to drill a new wellbore to that identified associated depth. (3) As another example, the embodiments consistent with this disclosure may be utilized to control flow of fluids injected into or received from the formation, a wellbore, or any combination thereof. Chokes or well control devices that are positioned on the surface, downhole, or any combination thereof may be used to control the flow of fluid into and out. For example, surface facility properties, such as choke size, etc., may be identified for the high producers and that identified choke size may be utilized to control fluid into or out of a different wellbore. (4) As an example, embodiments consistent with this disclosure may be utilized in hydrocarbon exploration and hydrocarbon production to select completions, components, fluids, etc.

For example, a variety of casing, tubing, packers, heaters, sand screens, gravel packs, items for fines migration, etc. may be selected for each wellbore to be drilled based on the corresponding items that are identified for the higher producers.

System—FIG. 1 is a block diagram illustrating a system of forecasting hydrocarbon production, such as a system 100, in accordance with some embodiments. For example, the system 100 may be utilized for forecasting production of a wellbore from historical data in a subterranean reservoir. While certain specific features are illustrated, those skilled in the art will appreciate from the present disclosure that various other features have not been illustrated for the sake of brevity and so as not to obscure more pertinent aspects of the embodiments disclosed herein.

To that end, the system 100 includes one or more processing units (CPUs) 102, one or more network interfaces 108 and/or other communication interfaces 103, memory 106, and one or more communication buses 104 for interconnecting these and various other components. The system 100 also includes a user interface 105 (e.g., a display 105-1 and an input device 105-2). The communication buses 104 may include circuitry (sometimes called a chipset) that interconnects and controls communications between system components. An operator can actively input information and review operations of system 100 using the user interface 105. User interface 105 can be anything by which a person can interact with system 100, which can include, but is not limited to, the input device 105-2 (e.g., a keyboard, mouse, etc.) or the display 105-1.

Memory 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from the CPUs 102. Memory 106, including the non-volatile and volatile memory devices within memory 106, comprises a non-transitory computer readable storage medium and may store data (e.g., production data and other data such as geographic data, geologic data, wellbore data, completion data, surface facility data, etc.), models, images, etc. In particular embodiments, the computer readable storage medium comprises at least some tangible devices, and in specific embodiments such computer readable storage medium includes exclusively non-transitory media.

In some embodiments, memory 106 or the non-transitory computer readable storage medium of memory 106 stores the following programs, modules and data structures, or a subset thereof including an operating system 116, a network communication module 118, and a forecasting hydrocarbon production module 120.

The operating system 116 includes procedures for handling various basic system services and for performing hardware dependent tasks.

The network communication module 118 facilitates communication with other devices via the communication network interfaces 108 (wired or wireless) and one or more communication networks, such as the Internet, other wide area networks, local area networks, metropolitan area networks, and so on.

In some embodiments, the forecasting hydrocarbon production module 120 executes the operations of the methods shown in the figures. The forecasting hydrocarbon production module 120 may include data sub-module 125, which handles and processes the data including production data, other data (e.g., geographic data, geologic data, wellbore data, completion data, and/or surface facility data), etc. The sub-module 125 may be utilized to clean and format the data, correct and remove erroneous data entries, and/or handle missing values, outliers, and skewed data. The sub-module 125 may be utilized to remove down time and/or ramp up from the production data. The sub-module 125 may also supply data to other sub-modules.

For example, the data may be inputted by an operator via the user interface 105, received from one or more sensors, received from one or more system of records, etc. The data from wellbores can be stored in a database in the system 100. Production data, processed production data without down time and/or ramp up, and other data (e.g., geographic, geologic, wellbore, completion data, and/or surface facility data) are all examples of information that can be stored in the database. Any information generated by system 100 may also be stored in the database.

Dynamic Production Rescaling (DPR) transformation sub-module 122 contains a set of instructions 122-1 and accepts metadata and parameters 122-2 that will enable it to transform the production data of the plurality of training wellbores and the production data of the at least one target wellbore such that the production data for all training wellbores and target wellbores are equivalent at the end of the first period of time. Machine learning and prediction sub-module 123 contains a set of instructions 123-1 and accepts metadata and parameters 123-2 that will enable it to generate a transformed production forecast for each target wellbore at the target forecast time responsive to the transformed production data. For example, the sub-module 123 learns the transformed (i.e., scaled) training wellbore data using a supervised machine learning algorithm and then predicts scaled future production of target wellbores subject to their production history. Dynamic Production Rescaling (DPR) back-transformation sub-module 124 contains a set of instructions 124-1 and accepts metadata and parameters 124-2 that will enable it to back transform the transformed production forecast for each target wellbore to remove the equivalency. The back transformed production forecast for each target wellbore is the final production forecast for each target wellbore. For example, the sub-module 124 back-transforms the scaled future production of target wellbores into unscaled production forecast for outputting. In some embodiments, the final production forecast for each target wellbore may be output to an operator or to another system (s) via the user interface 105, the network communication module 118, a printer, the display 105-1, a data storage device, any combination of thereof, etc.

Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and generating hydrocarbon production forecasts. For example, any of the sub-modules may optionally be able to generate a display that would be sent to and shown on the user interface display 105-1. In addition, any of the data or processed data products may be transmitted via the communication interface(s) 103 or the network interface 108 and may be stored in memory 106.

Method 200 is, optionally, governed by instructions that are stored in computer memory or a non-transitory computer readable storage medium (e.g., memory 106) and are executed by one or more processors (e.g., processors 102) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 200 is described as being performed by a computer system, although in some embodiments, various operations of method 200 are distributed across separate computer systems.

Figure 2:
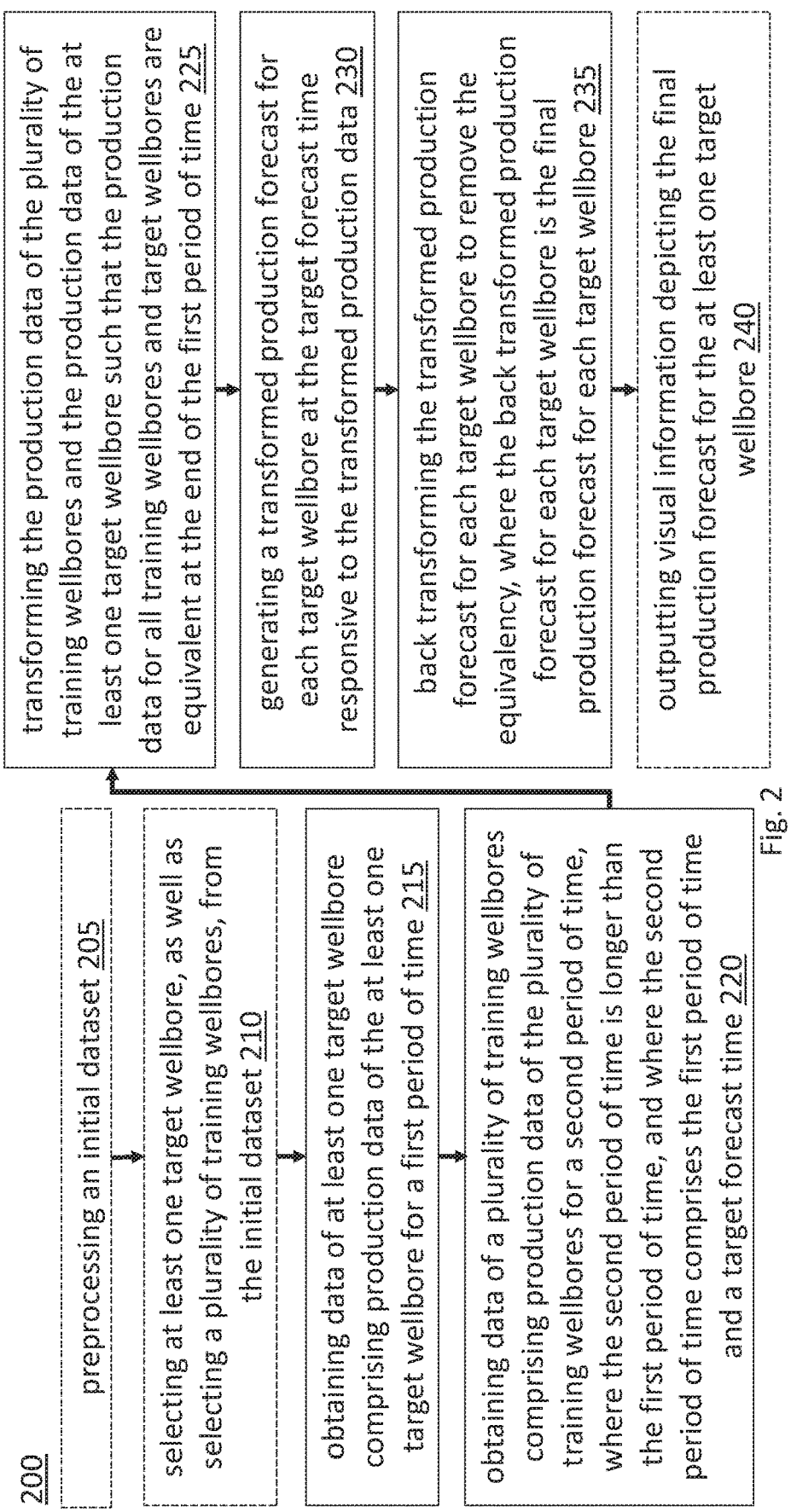
FIG. 2 illustrates one embodiment of a method of forecasting hydrocarbon production.
Figure 4:
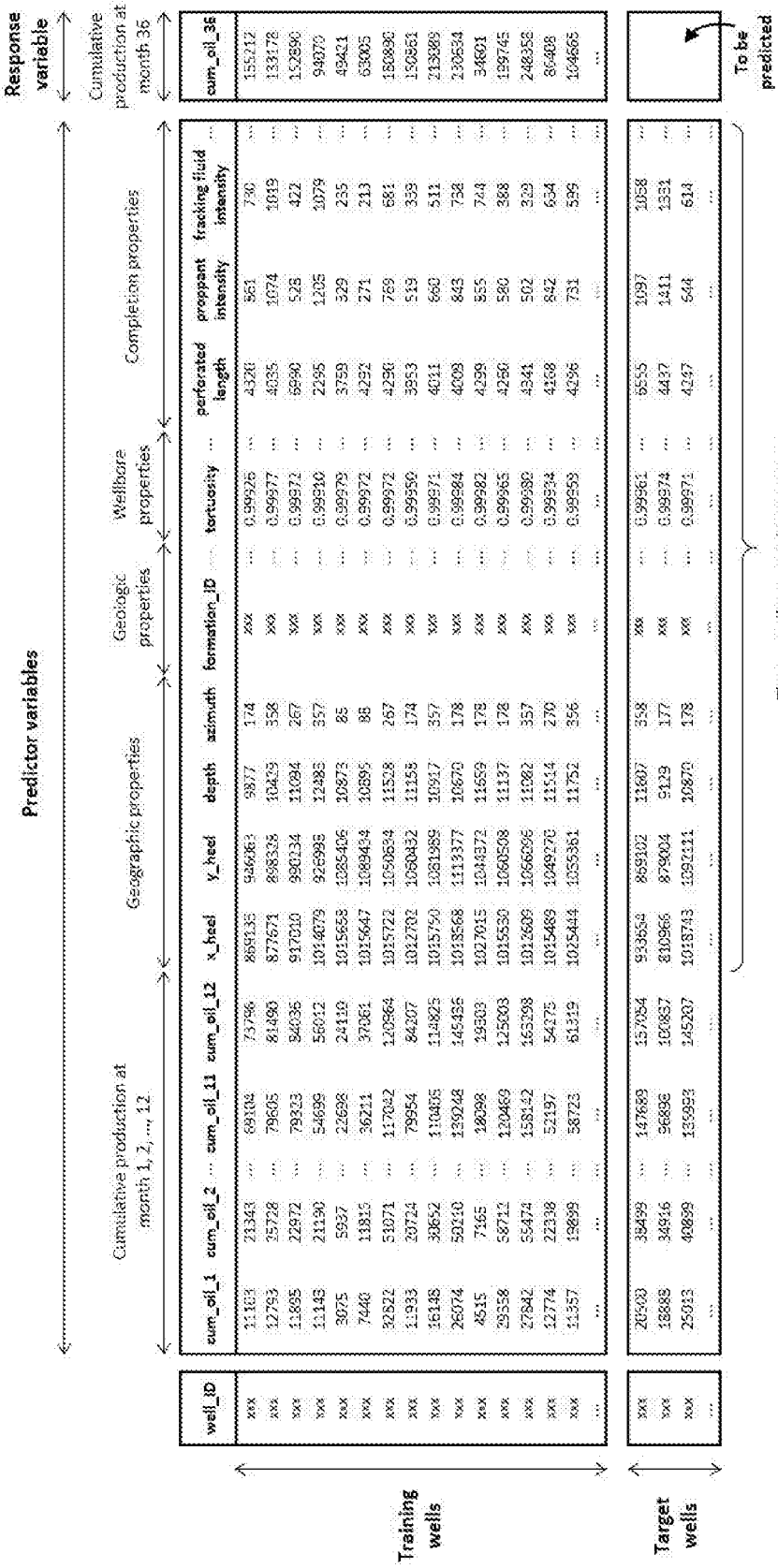
FIG. 4 illustrates example data that may be obtained for each target wellbore and each training wellbore in a running example.

Turning to FIG. 2, this figure illustrates one embodiment of a method of forecasting hydrocarbon production, such as a method 200. The method 200 of FIG. 2 may be executed by the system 100 of FIG. 1 and a running example in FIGS. 4-5 will be utilized to discuss some portions of the method 200. FIGS. 4-5 illustrates example data for 18 wellbores for simplicity, but data for hundreds of wellbores, or even thousands of wellbores, may be utilized in operation.

At 205, the method 200 optionally includes preprocessing an initial dataset. The initial dataset may include (a) production data for wellbores and (b) data corresponding to one or more properties for the wellbores, such as, but not limited to, geographic data, geologic data, wellbore data, completion data, surface facility data, or any combination thereof. The method 200 may preprocess the initial dataset using predetermined rules in an automated manner at 205. In some embodiments, user input may be solicited and utilized by the method 200 at 205.

The production data of a particular wellbore may be practically any type of production data, such as, but not limited to, historical production data, cumulative production data, or estimated ultimate recovery (EUR). Also, the production data may correspond to production of practically any type of hydrocarbon. In one embodiment, the production data corresponds to gas production. In one embodiment, the production data corresponds to oil production.

The geographic data of a particular wellbore may include practically any characteristic describing the location of the particular wellbore such as, but not limited to, (a) x and y information associated with location of the particular wellbore, (b) depth of the particular wellbore, (c) azimuth of the particular wellbore, (d) x,y,z of the heel of the particular wellbore, (e) x, y, z of the toe of the particular wellbore, (f) x, y, z of the midpoint of the particular wellbore; (g) x,y of the wellhead on the surface, (h) distance of x, y, z between the nearest neighboring wellbore, (i) distance from heel/toe/ midpoint to the top/bottom of the formation, (j) depth as in true vertical depth from the surface, (k) elevation from the sea level, (l) measured depth (total length of the particular wellbore measured along the actual well path), (m) name of the pad/county/state/lease where the particular wellbore belongs, etc.

The geologic data of a particular wellbore may include practically any characteristic describing the geology proximate to the particular wellbore such as, but not limited to, (a) identifier of the formation proximate to the particular wellbore, (b) properties of the formation rock (e.g., permeability, porosity, compressibility, Young's modulus, Poisson's ratio, percentage of silica, percentage of clay, percentage of calcite, brittleness, water saturation in pores, etc.), etc.

The wellbore property of a particular wellbore may be practically any characteristic of the particular wellbore that is not captured by the other properties, such as, but not limited to, (a) tortuosity, (b) number of peaks along the horizontal wellbore, (c) number of troughs along the horizontal wellbore, (d) is this particular wellbore a standalone wellbore or inner or outer wellbore among a group of wellbores, (e) is this particular wellbore a parent wellbore or infill child wellbore, (f) is the particular wellbore toe-up or toe-down, etc.

The completion data of a particular wellbore may include practically any characteristic describing the completion of the particular wellbore such as, but not limited to, (a) perforated length, (b) proppant intensity, (c) fracturing fluid intensity, (d) number of fracturing stages, (e) total amount of proppant, (f) total amount of fluid, (g) proppant to fluid ratio, (h) average stage length, (i) average proppant per stage, (j) average fluid per stage, (k) start date of completion job, (l) end date of completion job, (m) is the frac job primary fracturing or refracturing, (n) fracture fluid type and component(s), (o) proppant type and mesh size, (p) name of the fracturing method, etc.

The surface facility data of a particular wellbore may include practically any characteristic describing the surface facility (or portion of the surface facility) associated (e.g., fluidly coupled) with the particular wellbore such as, but not limited to, choke size, wellhead pressure, etc. The surface facility may include practically any device (e.g., choke, wellhead, separator, etc.) on the surface that is fluidly coupled (directly or indirectly) to the particular wellbore.

The preprocessing procedures include, but are not limited to, data preprocessing such as, but not limited to: (i) data cleaning and formatting, (ii) correcting or removal of erroneous data entries, and/or (iii) handling missing values, outliers, and skewed data. Data preprocessing may be applied to all the data in the initial dataset, including the production data, the geographic data, the geologic data, the wellbore data, the completion data, and the surface facility data. Preprocessing procedures may also include removal of down time from production data. Preprocessing procedures may also include removal of ramp up from production data. Practically any preprocessing procedure known to those of ordinary skill in the art may be utilized.

Turning more specifically to down time and ramp up, the preprocessing procedures may include removal of down time from the production data, removal of ramp up from the production data, or any combination thereof. For example, down time and ramp up may be removed from the production data in the initial dataset. Removal of down time and ramp up may improve the production forecast accuracy.

Figure 3A:
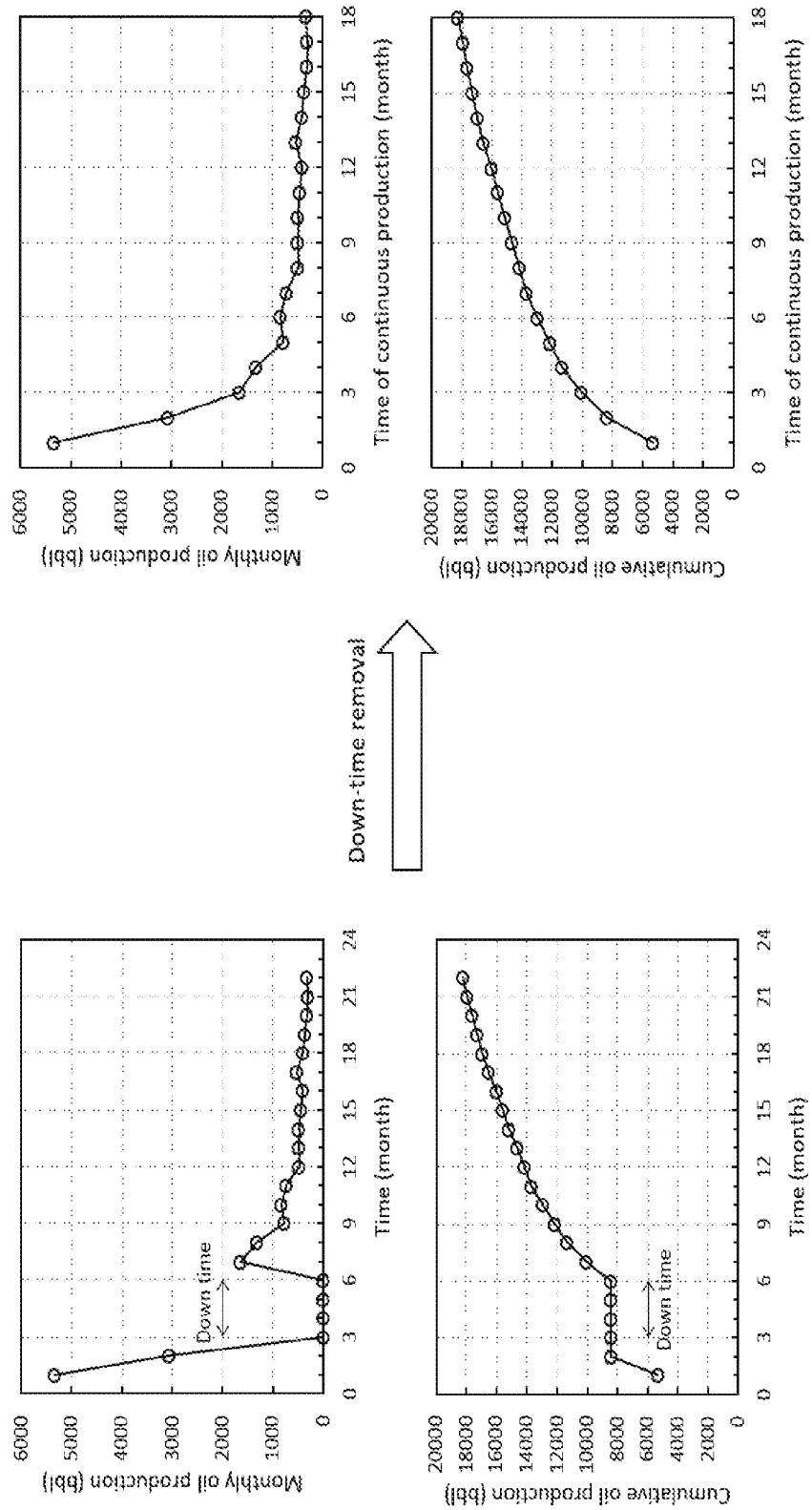
FIG. 3A illustrates two examples of down time removal from production data for a particular wellbore.

FIG. 3A illustrates two examples of down time removal from production data for a particular wellbore. The left-hand side of FIG. 3A illustrates monthly oil production and cumulative oil production of the particular wellbore with down time. No production occurred during the period from months 3 to 6, which is called "down time." Down time removal was performed by removing the down time from the time axis (i.e., x axis) such that the production before and after down time is continuous on the new time axis, as indicated on the right-hand side of the FIG. 3A. In particular, the monthly production at month 7 in the left-hand side of FIG. 3A was made the monthly production at month 3 in the right-hand side of FIG. 3A to remove the down time in the months 3 to 6. The length of monthly production data decreased accordingly from 22 months in the left-hand side of FIG. 3A to 18 months in the right-hand side of FIG. 3A due to the down time removal.

Similarly, the cumulative production at month 7 in the left-hand side of FIG. 3A was made the cumulative production at month 3 in the right-hand side of FIG. 3A to remove the down time in the months 3 to 6. The length of cumulative production data decreased accordingly from 22 months in the left-hand side of FIG. 3A to 18 months in the right-hand side of FIG. 3A due to the down time removal. The time axis was also renamed from "Time (month)" in the left-hand side of FIG. 3A to "Time of continuous production (month)" in the right-hand side of FIG. 3A.

Figure 3B:
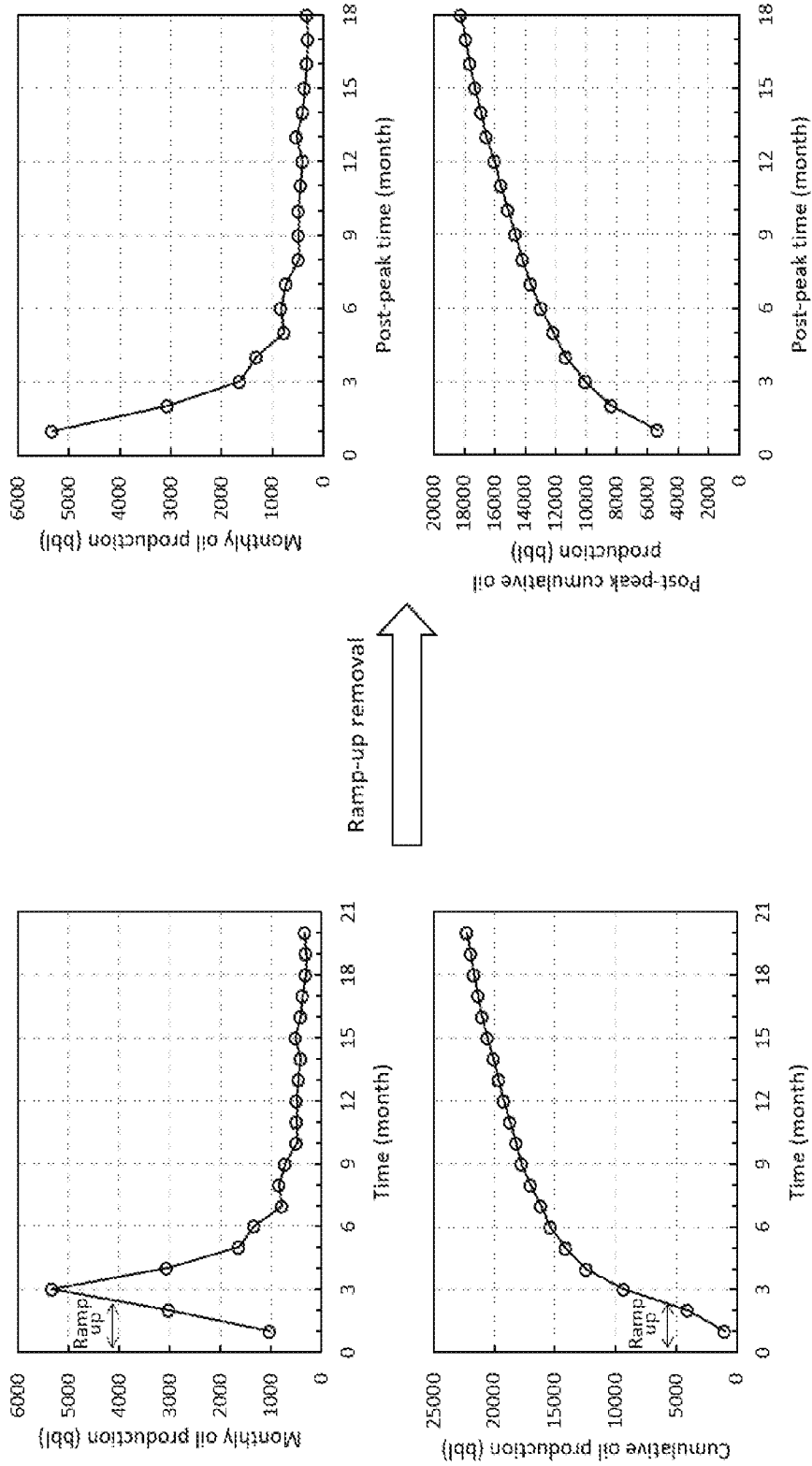
FIG. 3B illustrates two examples of ramp up removal from production data for a particular wellbore.

FIG. 3B illustrates two examples of ramp up removal from production data for a particular wellbore. The left-hand side of FIG. 3B indicates that the monthly oil production peaked in month 3 for the particular wellbore. Hence, the pre-peak period of months 1 and 2 is called "ramp up." Ramp up removal is performed by removing the ramp up period from the time axis. On the new time axis, the production curve starts at the peak month, which is now re-defined as month 1, as illustrated on the right-hand side of FIG. 3B. Specifically, the monthly production at month 3 in the left-hand side of FIG. 3B was made the monthly production at month 1 in the right-hand side of FIG. 3B to remove the ramp up in the months 1 to 2. The length of monthly production data decreased accordingly from 20 months in the left-hand side of FIG. 3B to 18 months in the right-hand side of FIG. 3B due to the ramp up removal.

Moreover, on the new time axis, the term "cumulative production" refers to post-peak cumulative production, which is the actual cumulative production minus the pre-peak cumulative. Pre-peak cumulative is the cumulative production at month 2 (i.e., the sum of production in months 1 and 2) on the original time axis on the left-hand side of FIG. 3B. The post peak cumulative production at month 1 in the right-hand side of FIG. 3B is calculated by subtracting the pre-peak cumulative from the actual cumulative production at month 3 in the left-hand side of FIG. 3B. The length of cumulative production data decreased accordingly from 20 months in the left-hand side of FIG. 3B to 18 months in the right-hand side of FIG. 3B due to the ramp up removal. After ramp up removal, it is the post-peak cumulative production that will be learned and forecasted in subsequent steps of the method of FIG. 2. However, in some embodiments, the pre-peak cumulative production may be included as an additional predictor variable in the method 200.

Thus, the initial dataset may be modified to remove down time and ramp up as described hereinabove, and removal of down time and ramp up may change (e.g., shorten) the length of production data in the initial dataset. A person of ordinary skill in the art may envision other methodologies to remove down time from production data. Moreover, a person of ordinary skill in the art may envision other methodologies to remove ramp up from production data.

In some embodiments, an operator (e.g., a human user) may manually perform the preprocessing changes to the initial dataset that he or she desires. Hence, the block 205 may be optional in the method 200.

At 210, the method 200 optionally includes selecting at least one target wellbore, as well as selecting a plurality of training wellbores, from the initial dataset. Target wellbores are the wellbores whose future hydrocarbon production is to be forecasted at the target forecast time. Training wellbores are the wellbores whose data are used for training to make hydrocarbon production forecasts on the target wellbores. The at least one target wellbore and the plurality of training wellbores may be selected after removal of down time, after removal of ramp up, and after data preprocessing have been performed (e.g., by optional block 205) in some embodiments. However, the at least one target wellbore and the plurality of training wellbores may be selected without removal of down time, without removal of ramp up, and without data preprocessing in some embodiments.

Moreover, the method 200 may select the at least one target wellbore and/or the plurality of training wellbores using predetermined rules in an automated manner at 210. In some embodiments, user input may be solicited and utilized by the method 200 at 210. It may be advantageous for the method 200 to select the at least one target wellbore and/or select the plurality of training wellbores in an automated manner because the initial dataset may include tens to hundreds to thousands of wellbores (and potentially millions of data records). Furthermore, the length of time of the production data may be the same or differ among wellbores. For example, a wellboreA and a wellboreB may have been drilled and placed in production around the same time, and therefore, the wellboreA and the wellboreB have production data of the same length of time. On the other hand, the wellboreC may have been drilled earlier than the wellboreD, and therefore, the wellboreC may have been placed in production before the wellboreD such that the wellboreC has production data for a longer length of time than the wellboreD. And, removal of ramp up, removal of down time, and performance of data preprocessing may also modify production length in some embodiments. Therefore, it may be advantageous for the method 200 to select the at least one target wellbore and/or select the plurality of training wellbores in an automated manner.

In some embodiments, the method 200 may automatically select which wellbore to designate as a target wellbore by (i) determining which wellbore from the initial dataset does not have a final production forecast, (ii) determining which wellbore from the initial dataset has an outdated final production forecast based on a threshold, and/or (iii) determining which wellbore from the initial dataset has been on production less time than other wellbores by comparing length of production data or comparing the length of production data to a threshold; and then designating one or more of those determined wellbores as a target wellbore.

In some embodiments, the method 200 may automatically select which wellbore to designate as a training wellbore by (i) determining which wellbore from the initial dataset has been on production more time than other wellbores by comparing length of production data or comparing the length of production data to a threshold, (ii) determining which wellbore in the initial dataset has production data at the target forecast time, and/or (iii) determining which wellbores remain in the initial dataset that are not target wellbores; and then designating one or more of those determined wellbores as a training wellbore.

In some embodiments, the method 200 may automatically select which wellbore to designate as a target wellbore and/or which wellbore to designate as a training wellbore by bucketing or sorting. In an example with 10 wellbores, wellboreA may have 12 months of history, wellboreB may have 13 months of history, wellboreC may have 12 months of history . . . and wellboreJ may have 18 months of history. A bucket can be created for each production history length, such as a 12 months of history bucket with 2 wellbores, a 13 months of history bucket with 1 wellbore, a 14 months of history bucket with 4 wellbores, and an 18 months of history bucket with 3 wellbores. Then, for the 12 months of history bucket with 2 wellbores, these 2 wellbores become the target wellbores and wellbores with the target forecast time of history (which is beyond 12 months) can be selected as training wellbores. The 12 months of history is used as the first period of time for the first bucket. Then, for the 13 months of history bucket with 1 wellbore, this 1 wellbore becomes the target wellbore and wellbores with the target forecast time of history (which is beyond 13 months) can be selected as training wellbores. The 13 months of history is used as the first period of time for the second bucket, and so on.

In some embodiments, the method 200 may even automatically select the target forecast time. For example, if the training wellbores have been selected and the target forecast time has not been selected, the method 200 may include comparing the length of production data of the training wellbores and then selecting a time in the production data of the training wellbores for which all of the training wellbores have production data (and the time is beyond the length of production data of the target wellbore(s)) as the target forecast time. As another example, if the training wellbores have not been selected and the target forecast time has not been selected, the method 200 may include comparing length of production data of wellbores in the initial dataset to determine the wellbores with longer production, and then selecting a time in this production data for which all of these wellbores have production data (and the time is beyond the length of production data of the target wellbore(s)) as the target forecast time. These wellbores with longer production can also be selected as training wellbores.

The method 200 may also automatically compare the availability of property related data in the initial dataset to select target wellbore(s) and select training wellbores. In one embodiment, the selected target wellbore(s) and the selected training wellbores have data available for the same property or properties. For example, each selected target wellbore(s) and each selected training wellbores have data for the completion property and the geologic property in addition to their production data.

Of note, in some embodiments, selecting the at least one target wellbore and/or selecting the plurality of training wellbores in an automated manner may even include receiving user input from an operator confirming the selected target wellbore(s) and/or training wellbores of the method 200 in some embodiments.

In some embodiments, an operator (e.g., a human user) may manually select the at least one target wellbore and/or the plurality of training wellbores that he or she desires. For example, in some embodiments, an operator (e.g., a human user) may select wellbores as target wellbores and/or training wellbores based on experience, other reasons, etc. The operator may also select the target forecast time, for example, based on experience, other reasons, etc. Hence, the block 210 may be optional in the method 200.

At 215, the method 200 comprises obtaining data of at least one target wellbore comprising production data of the at least one target wellbore for a first period of time. As illustrated hereinabove, one or more preprocessing procedures (steps 205-210) may be performed on an initial dataset as part of the method 200 or performed by an operator. Alternatively, one or more preprocessing procedures may be omitted.

Nonetheless, at 215, the method 200 may obtain data for a single target wellbore or a plurality of target wellbores. The terminology "obtaining data" includes accessing data, requesting data, receiving data, and practically any other manner known to those of ordinary skill in the art to obtain data. In some embodiments, down time, ramp up, data preprocessing, or any combination thereof has been performed (e.g., see 205-210) for the at least one target wellbore. In some embodiments, production data, geographic data, geologic data, wellbore data, completion data, surface facility data, or any combination thereof may be obtained at 215, for example, from the initial dataset or from other source/storage or using some other methodology depending on the embodiment. As with the production data, target wellbores may differ as to other data (e.g., non-production data) that is available. As an example, a target wellboreM may have completion data available, but a target wellboreN may not. For example, a target wellboreO may have geologic data available, but a target wellboreP may not, and so on. In one embodiment, the selected target wellbore(s) and selected training wellbores have data available for the same property or properties. For example, prior to 215 such as at 210, the method 200 may also compare the availability of property related data in selecting target wellbores and training wellbores.

Regarding the first period of time, the first period of time refers to a length of time for which each target wellbore has production data. In some embodiments, at 215 or prior to 215 such as at 210, the method 200 may automatically select the first period of time (e.g., by comparing timestamps or dates associated with the production data of the target wellbores, and then selecting a period of time that the target wellbores have in common). Alternatively, an operator may manually select the first period of time. At 215, the method 200 comprises obtaining data of the at least one target wellbore for the first period of time.

FIG. 4 illustrates example data that may be obtained for each target wellbore in the running example: production data (e.g., cumulative production for months 1-12 after removal of down time and ramp up), geographic data (e.g., x_heel, y_heel, depth, and azimuth), geologic data (e.g., formation_ID), wellbore data (e.g., tortuosity), and completion data (e.g., perforated length, proppant intensity, and fracturing fluid intensity). As each target wellbore has production data for months 1-12, then the first period of time comprises months 1-12. The production data for the months 1-12 will be utilized for forecasting hydrocarbon production of each of the three target wellbores at the target forecast time of month 36 in the running example. Of note, it is possible for one or more of the three target wellbores illustrated in FIG. 4 to have additional production data (e.g., production data for month 13, months 13-15, etc.), but this additional production data will not be utilized to generate a final production forecast for each of the three target wellbores of FIG. 4 in the running example.

At 220, the method 200 comprises obtaining data of a plurality of training wellbores comprising production data of the plurality of training wellbores for a second period of time. The second period of time is longer than the first period of time. The second period of time comprises the first period of time and a target forecast time, such as the target forecast time discussed hereinabove. As illustrated hereinabove, one or more preprocessing procedures (steps 205-210) may be performed on an initial dataset as part of the method 200 or performed by an operator. Alternatively, one or more preprocessing procedures may be omitted.

Nonetheless, at 220, the method 200 may obtain data for a plurality of training wellbores. The terminology "obtaining data" includes accessing data, requesting data, receiving data, and practically any other manner known to those of ordinary skill in the art to obtain data. In some embodiments, down time, ramp up, other data preprocessing, or any combination thereof has been performed (e.g., see 205-210) for the plurality of training wellbores. In some embodiments, production data, geographic data, geologic data, wellbore data, completion data, surface facility data, or any combination thereof may be obtained at 220, for example, from the initial dataset or from other source/storage or using some other methodology depending on the embodiment. As with the production data, training wellbores may differ as to other data (e.g., non-production data) that is available. In one embodiment, the selected target wellbore(s) and selected training wellbores have data available for the same property or properties. For example, prior to 220 such as at 210, the method 200 may also compare the availability of property related data in selecting target wellbores and training wellbores.

In some embodiments, at 220 or prior to 220 such as at 210, the method 200 may automatically select the second period of time (e.g., by comparing timestamps or dates associated with the production data of the training wellbores, and then selecting a period of time that the training wellbores have in common beyond the first period of time). Alternatively, an operator may manually select the second period of time. At 220, the method 200 comprises obtaining data of the plurality of training wellbores for the second period of time.

Per the running example, FIG. 4 illustrates example data that may be obtained for each training wellbore in the running example: production data (e.g., cumulative production for months 1-12 and the target forecast time at month 36 after removal of down time and ramp up), geographic data (e.g., x_heel, y_heel, depth, and azimuth), geologic data (e.g., formation_ID), wellbore data (e.g., tortuosity), and completion data (e.g., perforated length, proppant intensity, and fracturing fluid intensity). As each training wellbore has production data for months 1-12 and month 36, then the second period of time comprises months 1-12 and month 36. The production data for the months 1-12 and month 36 will be utilized for forecasting hydrocarbon production of the three target wellbores at the target forecast time of month 36 in the running example. Of note, it is possible for one or more of the fifteen training wellbores illustrated in FIG. 4 to have additional production data (e.g., production data at month 37, months 37-38, etc.), but this additional production data will not be utilized to generate a final production forecast for each of the three target wellbores of the FIG. 4 in the running example.

Referring to 215 and 220, as will be discussed further hereinbelow, the data contains several predictor variables for both the training and target wellbores. For example, $t_{history}$ denotes the length of production history of the target wellbores at end of the first period of time—the moment when production forecast is performed. For example, $t_{forecast}$ denotes the time in the future when the forecast is sought for the target wellbores (e.g., target forecast time). The target wellbores all have $t_{history}$ length of production history (e.g., the first period of time), and the training wellbores should have at least $t_{forecast}$ length of production history (e.g., the second period of time) such that $t_{forecast} > t_{history}$. For example, the predictor variables include cumulative production data at different time t for $t < t_{history}$ and cumulative production at $t_{history}$. The predictor variables can also include other data, such as, but not limited to, geographic data, geologic data, wellbore data, completion data, surface facility data, or any combination thereof. The response variable of the data is cumulative production at $t_{forecast}$. This response variable is known for the training wellbores and it is to be predicted (unknown) for the target wellbores.

In the running example illustrated in FIG. 4, $t_{history}$=12 (month) and $t_{forecast}$=36 (month). The target wellbores all have 12 months of production history, and the training wellbores all have at least 36 months of history. The predictor variables include the training and target wellbores' cumulative oil production at month 1, 2, ..., 12, geographic properties (e.g., x, y coordinates at the heel of the horizontal wellbore, depth, and azimuth), geologic properties (e.g., formation ID and other rock properties), wellbore properties (e.g., tortuosity), and completion properties (e.g., perforated length, proppant and fracking fluid intensity). Cumulative oil production at month 36 is the response variable. The objective of this running example is to predict the cumulative oil production at month 36 of the three target wellbores by learning from the data of the fifteen training wellbores.

The time unit need not be limited to month, and production data need not be limited to oil. The properties (e.g., geographic, geologic, wellbore, and completion) to be included as predictor variables can vary depending on data availability. Moreover, if down time and ramp up removals are to be performed, it is advantageous for down time and ramp up to be removed from the production data of each target wellbore and each training wellbore for consistency.

At 225, the method 200 comprises transforming the production data of the plurality of training wellbores and the production data of the at least one target wellbore such that the production data for all training wellbores and target wellbores are equivalent at the end of the first period of time. In one embodiment, transforming the production data of the plurality of training wellbores and the production data of the at least one target wellbore comprises using a dynamic production rescaling (DPR) transformation algorithm provided herein. One example of the dynamic production rescaling transformation algorithm is described as follows:

--- for i = 1 to the number of training wellbores
    for $t < t_{history}$ scaled production of *wellbore i* at time $t =$
$$\frac{\text{production of } wellbore\ i \text{ at time } t}{\text{production of } wellbore\ i \text{ at time } t_{history}}$$

end scaled production of *wellbore i* at time $t_{forecast} =$
$$\frac{\text{production of } wellbore\ i \text{ at time } t_{forecast}}{\text{production of } wellbore\ i \text{ at time } t_{history}}$$

end
    for j = 1 to the number of target wellbores
        for $t < t_{history}$ scaled production of *wellbore j* at time $t =$
$$\frac{\text{production of } wellbore\ j \text{ at time } t}{\text{production of } wellbore\ j \text{ at time } t_{history}}$$

end
end

---

Rather than being a fixed value, the scaling factor (production of a wellbore at time $t_{history}$) depends on $t_{history}$, which is the length of production history of the target wellbores at the end of the first period of time—the moment when production forecast is performed. For a different set of target wellbores with different $t_{history}$, the scaling factor will be different. Even for the same target wellbore, if its production forecast is made at different time (e.g., one now and another a year later), the scaling factor will be different. Hence the name Dynamic Production Rescaling (DPR) is utilized.

The DPR transformation algorithm may include, for each training wellbore, dividing the production data of a particular training wellbore for each $t < t_{history}$ and the $t_{forecast}$ by the production data at $t_{history}$ of that particular training wellbore. Similarly, the DPR transformation algorithm may include, for each target wellbore, dividing the production data of a particular target wellbore for each $t<t_{history}$ by the production data at $t_{history}$ of that particular target wellbore. FIG. 5 illustrates examples of transforming the production data of the plurality of training wellbores and the production data of the at least one target wellbore such that the production data for all training wellbores and target wellbores are equivalent at the end of the first period of time. In FIG. 5, $t_{history}$=12 (month) and $t_{forecast}$=36 (month), and the cumulative production at month 1, 2, . . . , 11, and 36 are scaled.

Turning to the data for the first training wellbore in FIGS. 4-5, the cumulative production data at the end of the first period of time is 73796 as illustrated in the cum_oil_12 column of FIG. 4 and it can be transformed to 1 (not shown) by dividing 73796/73796. Of note, as cum_oil_12 of every well in this running example will be transformed to the same value 1, it is advantageous to keep the untransformed cum_oil_12 value in the dataset as a predictor variable. Furthermore, the first training wellbore has cumulative production data at month 11 of 69104 as illustrated in the cum_oil_11 column of FIG. 4, and it was transformed to 0.9364 as illustrated in the scaled cum_oil_11 column of FIG. 5 by dividing 69104/73796. Furthermore, the first training wellbore has cumulative production data at month 2 of 21343 as illustrated in the cum_oil_2 column of FIG. 4, and it was transformed to 0.2892 as illustrated in the scaled cum_oil_2 column of FIG. 5 by dividing 21343/73796. Furthermore, the first training wellbore has cumulative production data at month 1 of 11103 as illustrated in the cum_oil_1 column of FIG. 4, and it was transformed to 0.1505 as illustrated in the scaled cum_oil_1 column of FIG. 5 by dividing 11103/73796. The scaled cumulative production data in FIG. 5 for the other months of the first time period that are not shown (i.e., months 3-months 10) can be determined in the same manner for the first training wellbore. Furthermore, the first training wellbore has cumulative production data at month 36 of 155212 as illustrated in the cum_oil_36 column of FIG. 4, and it was transformed to 2.1032 as illustrated in the scaled cum_oil_36 column of FIG. 5 by dividing 155212/73796.

Turning to the data for the second training wellbore in FIGS. 4-5, the cumulative production data at the end of the first period of time is 81490 as illustrated in the cum_oil_12 column of FIG. 4, and it can be transformed to 1 (not shown) by dividing 81490/81490. Furthermore, the second training wellbore has cumulative production data at month 11 of 79605 as illustrated in the cum_oil_11 column of FIG. 4, and it was transformed to 0.9769 as illustrated in the scaled cum_oil_11 column of FIG. 5 by dividing 79605/81490. Furthermore, the second training wellbore has cumulative production data at month 2 of 25728 as illustrated in the cum_oil_2 column of FIG. 4, and it was transformed to 0.3157 as illustrated in the scaled cum_oil_2 column of FIG. 5 by dividing 25728/81490. Furthermore, the second training wellbore has cumulative production data at month 1 of 12793 as illustrated in the cum_oil_1 column of FIG. 4, and it was transformed to 0.1570 as illustrated in the scaled cum_oil_1 column of FIG. 5 by dividing 12793/81490. The scaled cumulative production data in FIG. 5 for the other months of the first time period that are not shown (i.e., months 3-months 10) can be determined in the same manner for the second training wellbore. Furthermore, the second training wellbore has cumulative production data at month 36 of 133178 as illustrated in the cum_oil_36 column of FIG. 4, and it was transformed to 1.6343 as illustrated in the scaled cum_oil_36 column of FIG. 5 by dividing 133178/81490. The scaled cumulative production data in FIG. 5 for all of the other thirteen training wellbores were determined in the same manner.

Turning to the data for the first target wellbore in FIGS. 4-5, the cumulative production data at the end of the first period of time is 157054 as illustrated in the cum_oil_12 column of FIG. 4, and it can be transformed to 1 (not shown) by dividing 157054/157054. Furthermore, the first target wellbore has cumulative production data at month 11 of 147689 as illustrated in the cum_oil_11 column of FIG. 4, and it was transformed to 0.9404 as illustrated in the scaled cum_oil_11 column of FIG. 5 by dividing 147689/157054. Furthermore, the first target wellbore has cumulative production data at month 2 of 38499 as illustrated in the cum_oil_2 column of FIG. 4, and it was transformed to 0.2451 as illustrated in the scaled cum_oil_2 column of FIG. 5 by dividing 38499/157054. Furthermore, the first target wellbore has cumulative production data at month 1 of 20500 as illustrated in the cum_oil_1 column of FIG. 4, and it was transformed to 0.1305 as illustrated in the scaled cum_oil_1 column of FIG. 5 by dividing 20500/157054. The scaled cumulative production data in FIG. 5 for the other months of the first time period that are not shown (i.e., months 3-months 10) can be determined in the same manner for the first target wellbore.

Turning to the data for the second target wellbore in FIGS. 4-5, the cumulative production data at the end of the first period of time is 100837 as illustrated in the cum_oil_12 column of FIG. 4, and it can be transformed to 1 (not shown) by dividing 100837/100837. Furthermore, the second target wellbore has cumulative production data at month 11 of 96898 as illustrated in the cum_oil_11 column of FIG. 4, and it was transformed to 0.9609 as illustrated in the scaled cum_oil_11 column of FIG. 5 by dividing 96898/100837. Furthermore, the second target wellbore has cumulative production data at month 2 of 34916 as illustrated in the cum_oil_2 column of FIG. 4, and it was transformed to 0.3463 as illustrated in the scaled cum_oil_2 column of FIG. 5 by dividing 34916/100837. Furthermore, the second target wellbore has cumulative production data at month 1 of 18888 as illustrated in the cum_oil_1 column of FIG. 4, and it was transformed to 0.1873 as illustrated in the scaled cum_oil_1 column of FIG. 5 by dividing 18888/100837. The scaled cumulative production data in FIG. 5 for the other months of the first time period that are not shown (i.e., months 3-months 10) can be determined in the same manner for the second target wellbore. The scaled cumulative production data in FIG. 5 for the third target wellbore was determined in the same manner.

However, in some embodiments, transforming the production data of the plurality of training wellbores and the production data of the at least one target wellbore such that the production data for all training wellbores and target wellbores are equivalent at the end of the first period of time may be performed differently. As an example, instead of scaling so that the production data at the end of the first period of time can be transformed to 1, such as by dividing 73796/73796 for the first training wellbore, a different scale (rather than 1) may be utilized in some embodiments such as 2, 3, etc. Practically any scale may be utilized as long as it is utilized consistently for the production data of each target wellbore and training wellbore.

After the DPR transformation algorithm is performed at 225, the predictor variables of the data are the scaled cumulative production at different time t for $t<t_{history}$ and cumulative production at $t_{history}$, and can also include other data such as geographic, geologic, wellbore, and completion data. The response variable of the data is the scaled cumulative production at $t_{forecast}$. These predictor and response variables with scaled data will be used at 230.

At 230, the method 200 comprises generating a transformed production forecast for each target wellbore at the target forecast time responsive to the transformed production data. In one embodiment, the generating the transformed production forecast for each target wellbore at the target forecast time responsive to the transformed production data comprises using a machine learning algorithm.

The machine learning algorithm learns relationships between predictor variables and a response variable. The predictor variables correspond to the transformed production data of the plurality of training wellbores for the first period of time, and the response variable corresponds to the transformed production data of the plurality of training wellbores at the target forecast time. The predictor variables further correspond to geographic data, geologic data, wellbore data, completion data, surface facility data, or any combination thereof of the plurality of training wellbores.

A supervised machine learning algorithm is a type of machine learning method that analyzes a training dataset, which contains a set of training examples, and maps its predictor variables to its response variable. The mapping can then be used to infer the responses of new examples that are not in the training dataset. A supervised machine learning algorithm may be utilized at 230. For example, the supervised machine learning algorithm studies the training wellbore data and learns the relationship between the predictor variables and the response variable. Then, the supervised machine learning algorithm uses such learning to predict the response variable of the target wellbores.

Practically any machine learning algorithm that may be utilized to generate a production forecast may be utilized at 230. In one embodiment, the machine learning algorithm comprises a supervised machine learning algorithm. In one embodiment, the machine learning algorithm comprises a supervised machine learning algorithm, such as, but not limited to, least-squares regression, random forest, support vector regression, artificial neural network, gradient boosting, or any combination thereof. Machine learning algorithms, including supervised machine learning algorithms, are discussed in papers such as, but not limited to: (a) BANDURA, L., HALPERT, A. D., & ZHANG, Z., Machine learning in the interpreter's toolbox: Unsupervised, supervised, and deep-learning applications, Society of Exploration Geophysicists, pp. 4633-4637, Nov. 30, 2018; (b) HE, J., LI, H., & MISRA, S., Data-Driven In-Situ Sonic-Log Synthesis in Shale Reservoirs for Geomechanical Characterization, Society of Petroleum Engineers, Aug. 1, 2019; and (c) SCHUETTER, J., MISHRA, S., ZHONG, M., & LAFOLLETTE, R., A Data-Analytics Tutorial: Building Predictive Models for Oil Production in an Unconventional Shale Reservoir, Society of Petroleum Engineers, Aug. 1, 2018, each of which is incorporated by reference.

In one embodiment, the machine learning algorithm comprises least-squares regression, such as, but not limited to, the least-squares regression discussed ZHONG, M., SCHUETTER, J., MISHRA, S., & LAFOLLETTE, R. F., Do Data Mining Methods Matter?: A Wolfcamp Shale Case Study, Society of Petroleum Engineers, Feb. 3, 2015, which is incorporated by reference. Least-squares regression was discussed by Gauss in about 1795 and published in about 1805 in the book "Nouvelles méthodes pour la détermination des orbites des comètes"). In one embodiment, the machine learning algorithm comprises random forest, such as, but not limited to, the random forest discussed in BREIMAN, L., Random forests, Machine learning, 45(1), pp. 5-32, 2001, which is incorporated by reference. In one embodiment, the machine learning algorithm comprises support vector regression, such as, but not limited to, the support vector regression discussed in BOSER, B. E., GUYON, I. M., VAPNIK, V. N., A training algorithm for optimal margin classifiers, Proceedings of the Fifth Annual Workshop on Computational Learning Theory, ACM, pp. 144-152, July 1992, which is incorporated by reference. In one embodiment, the machine learning algorithm comprises artificial neural network, such as, but not limited to, the artificial neural network discussed in SCHMIDHUBER, J., Deep learning in neural networks: An overview. Neural Networks, 61, pp. 85-117, 2015, which is incorporated by reference. In one embodiment, the machine learning algorithm comprises gradient boosting, such as, but not limited to, the gradient boosting discussed in FRIEDMAN, J. H., Greedy function approximation: a gradient boosting machine, Annals of statistics, pp. 1189-1232, 2001, which is incorporated by reference. In one embodiment, the machine learning algorithm comprises a plurality of machine learning algorithms, such as a plurality of the machine learning algorithms discussed herein.

The output at 230 of the method 200 is the predicted scaled cumulative production at $t_{forecast}$ for the target wellbores (i.e., the transformed production forecast for each target wellbore at the target forecast time responsive to the transformed production data), for example, generated by the machine learning algorithm.

Returning to the running example, a transformed production forecast was generated for each target wellbore at the target forecast time responsive to the transformed production data with random forest as the machine learning algorithm. The transformed production forecast at month 36 generated by the machine learning algorithm for the first target wellbore is 1.8207. The transformed production forecast at month 36 generated by the machine learning algorithm for the second target wellbore is 1.6348. The transformed production forecast at month 36 generated by the machine learning algorithm for the third target wellbore is 1.7610.

At 235, the method 200 comprises back transforming the transformed production forecast for each target wellbore to remove the equivalency (e.g., to reverse the transformation from 225). For example, each predicted scaled cumulative production from 230 is back-transformed at 235. In one embodiment, back transforming the transformed production forecast for each target wellbore comprises using a dynamic production rescaling (DPR) back-transformation algorithm. One example of the dynamic production rescaling back-transformation algorithm is described as follows:

```
for j = 1 to the number of target wellbores
    predicted production of wellbore j at time t_forecast =
        predicted scaled production of wellbore j at time t_forecast ×
        production of wellbore j at time t_history
end
```

Returning to the running example, the transformed production forecast at month 36 generated by the machine learning algorithm for the first target wellbore of 1.8207 can be multiplied with 157054 from the cum_oil_12 column of FIG. 4 to back-transform the transformed production forecast at month 36 to 285948. The transformed production forecast at month 36 generated by the machine learning algorithm for the second target wellbore of 1.6348 can be multiplied with 100837 from the cum_oil_12 column of FIG. 4 to back-transform the transformed production forecast at month 36 to 164848. The transformed production forecast at month 36 generated by the machine learning algorithm for the third target wellbore of 1.7610 can be multiplied with 145207 from the cum_oil_12 column of FIG. 4 to back-transform the transformed production forecast at month 36 to 255710. Back transforming the transformed production forecast for each target wellbore removes the equivalency, for example, introduced at 225.

The back transformed production forecast for each target wellbore is the final production forecast for each target wellbore, in other words, the predicted cumulative production at $t_{forecast}$ for each target wellbore (after back transformation) is the final production forecast for each target wellbore. Thus, in the running example, the final production forecast at month 36 for the first target wellbore is 285948, the final production forecast at month 36 for the second target wellbore is 164848, and the final production forecast at month 36 for the third target wellbore is 255710. DPR allows the production trend to be captured consistently and effectively by a machine learning algorithm, which may lead to more accurate production forecasts with small bias, small error standard deviation, and small error skewness.

At 240, the method 200 optionally comprises outputting visual information depicting the final production forecast for the at least one target wellbore. For example, the visual information depicting the final production forecast for each target wellbore may be output via a user interface, such as the user interface 105.

Figure 6B:
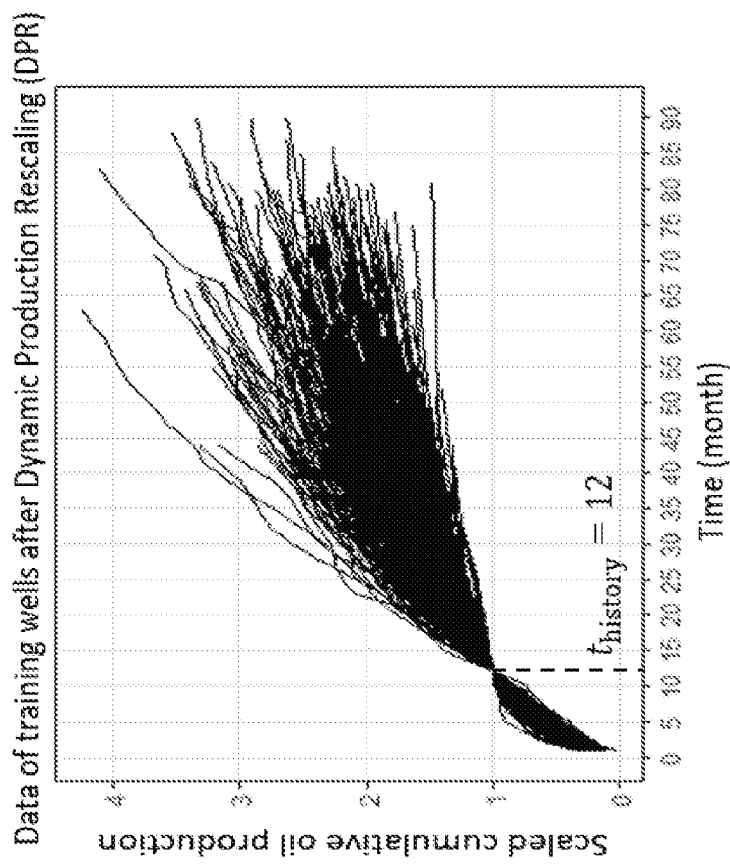
FIGS. 6A-6B illustrate one example that graphically depicts the effect of DPR on the production curves of a set of training wellbore examples.
Figure 6A:
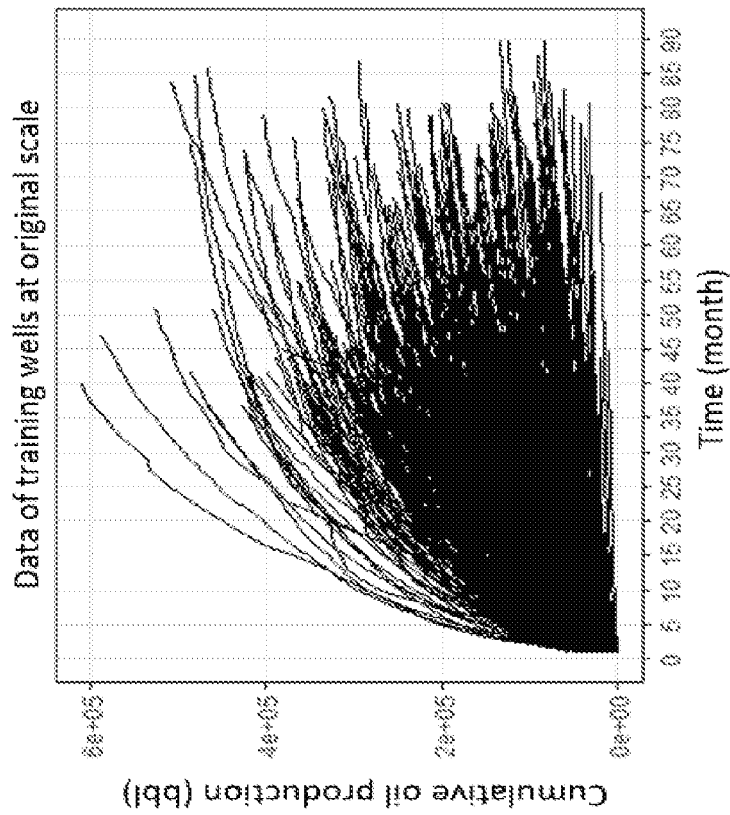
Figure 7A:
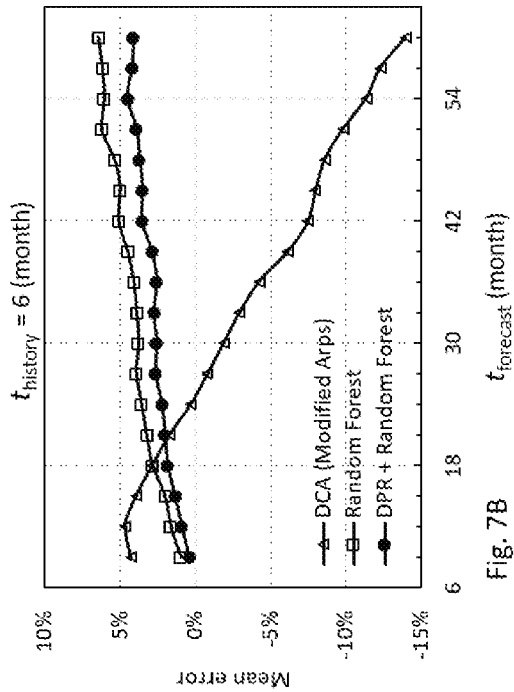
FIGS. 7A-7D illustrate examples that compare three methods on forecast accuracy of oil production in an unconventional formation subject to 6 months of historical data, using $R^2$, mean error, error standard deviation, and error skewness as accuracy metrics, and using random forest as the supervised machine learning algorithm.
Figure 7B:
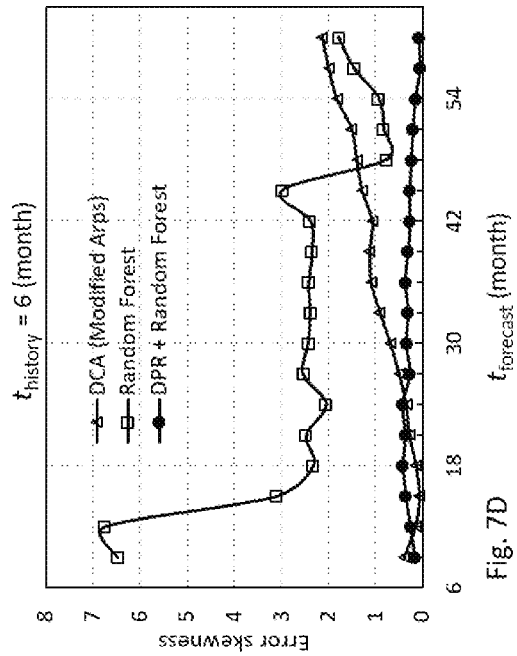
Figure 7C:
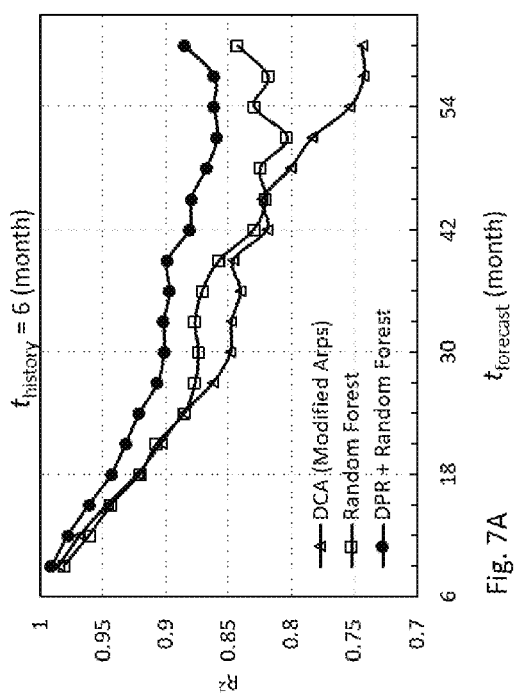
Figure 7D:
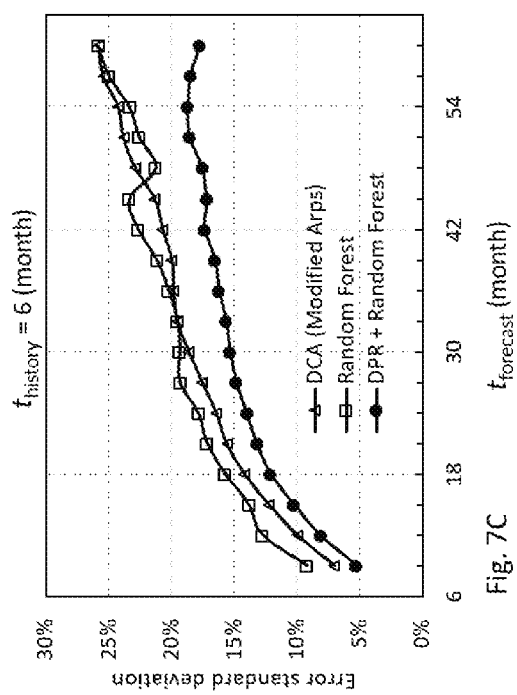
Figure 8A:
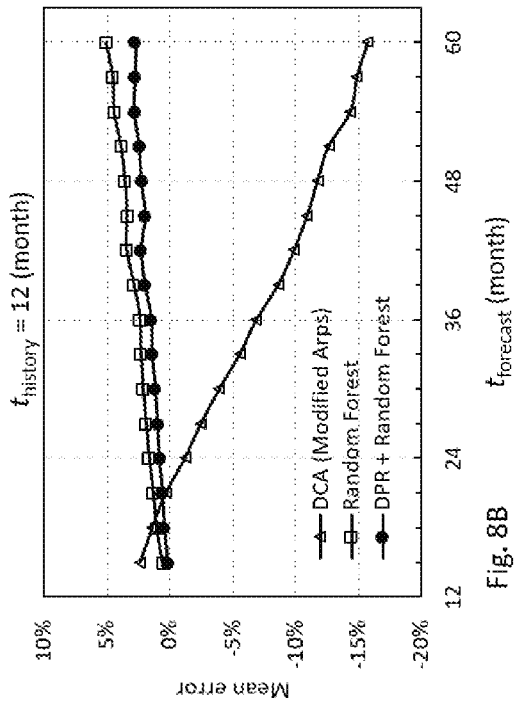
FIGS. 8A-8D illustrate examples that compare three methods on forecast accuracy of oil production in an unconventional formation subject to 12 months of historical data, using $R^2$, mean error, error standard deviation, and error skewness as accuracy metrics, and using random forest as the supervised machine learning algorithm.
Figure 8B:
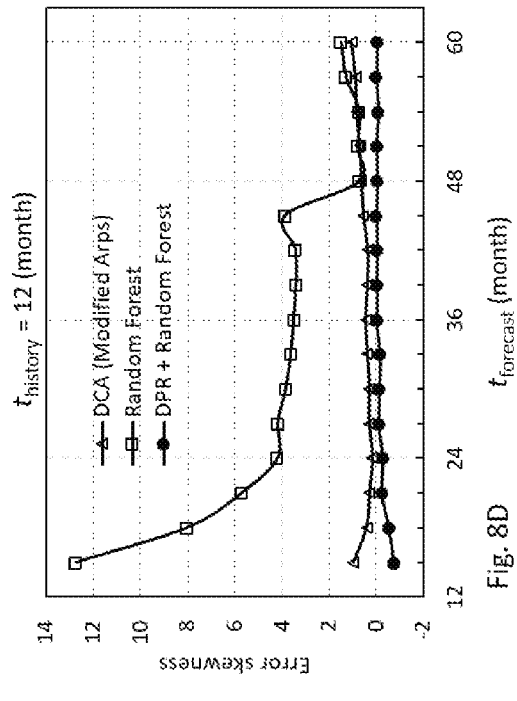
Figure 8C:
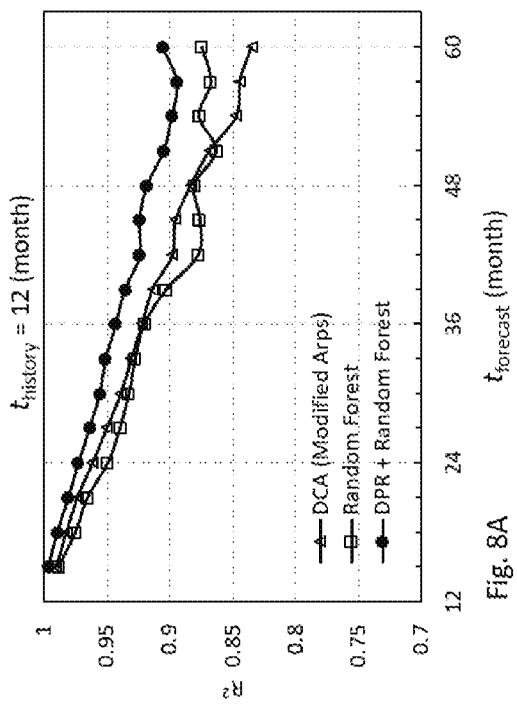
Figure 8D:
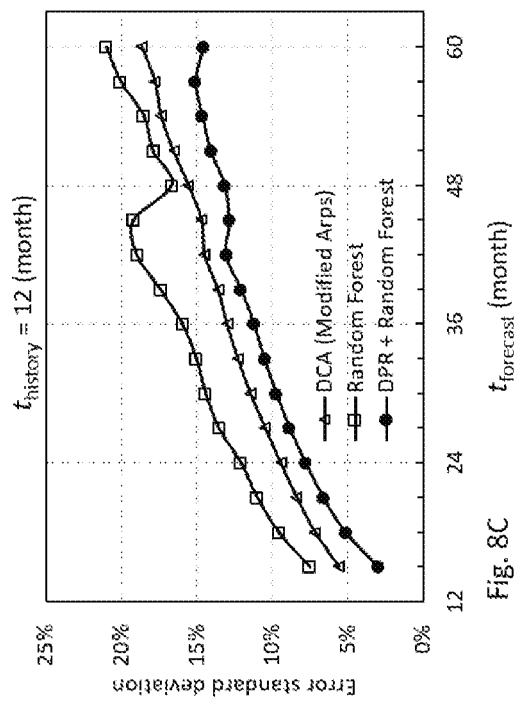
Figure 9A:
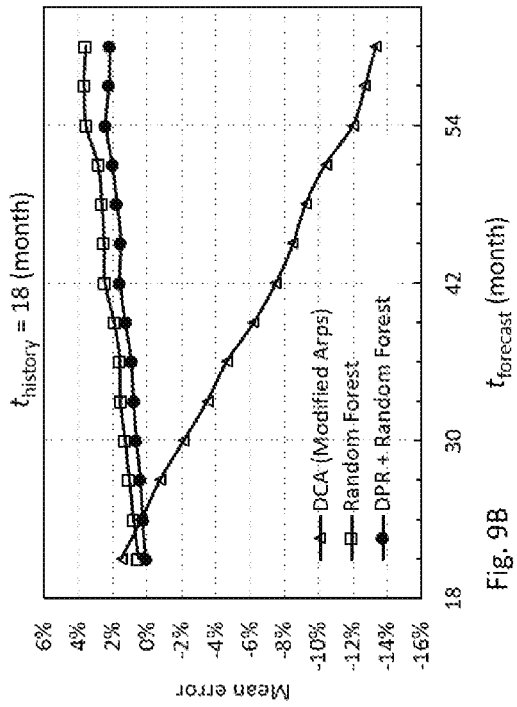
FIGS. 9A-9D illustrate examples that compare three methods on forecast accuracy of oil production in an unconventional formation subject to 18 months of historical data, using $R^2$, mean error, error standard deviation, and error skewness as accuracy metrics, and using random forest as the supervised machine learning algorithm.
Figure 9B:
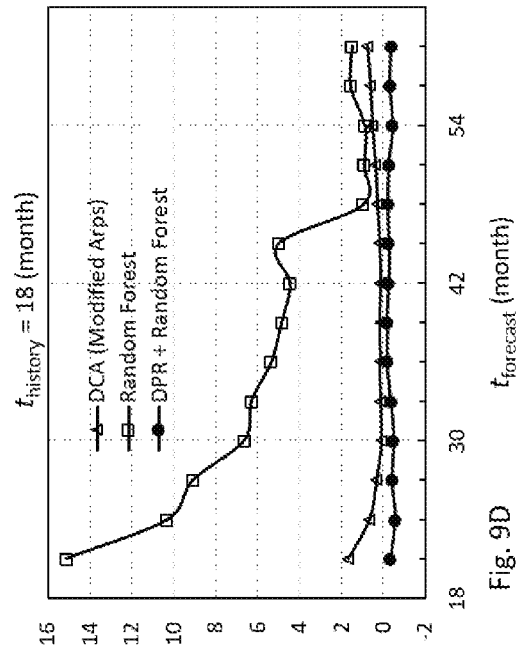
Figure 9C:
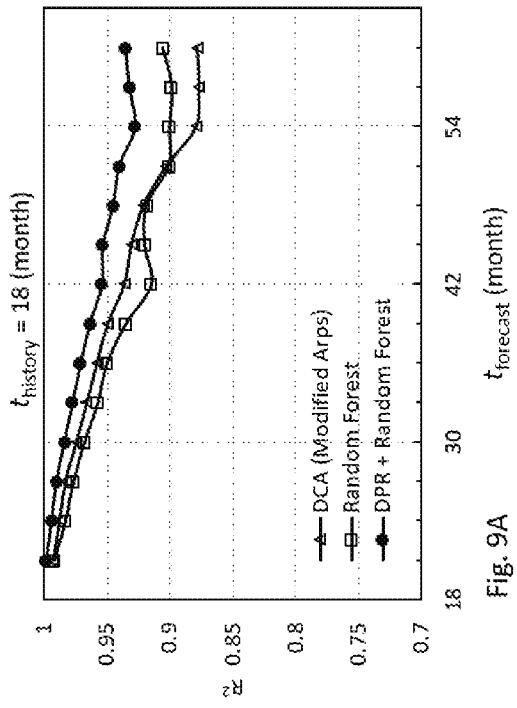
Figure 9D:
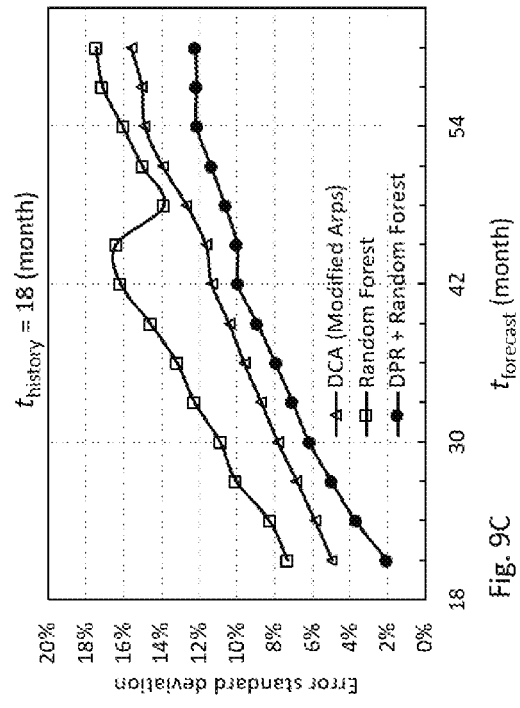
Figure 10B:
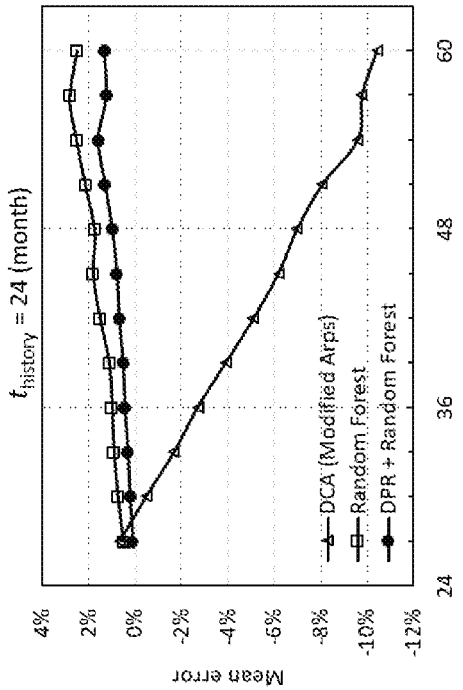
FIGS. 10A-10D illustrate examples that compare three methods on forecast accuracy of oil production in an unconventional formation subject to 24 months of historical data, using $R^2$, mean error, error standard deviation, and error skewness as accuracy metrics, and using random forest as the supervised machine learning algorithm.
Figure 10D:
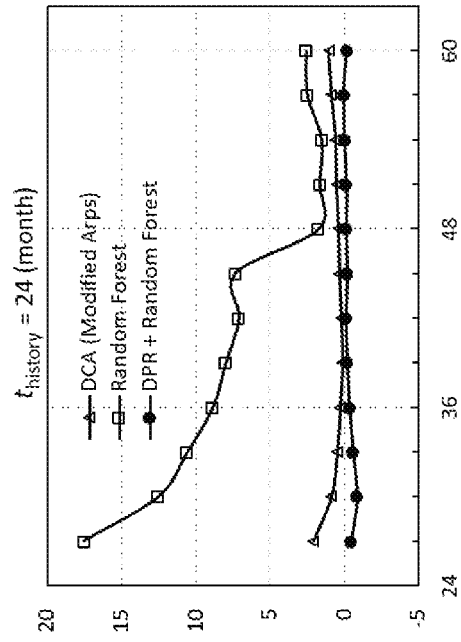
Figure 10A:
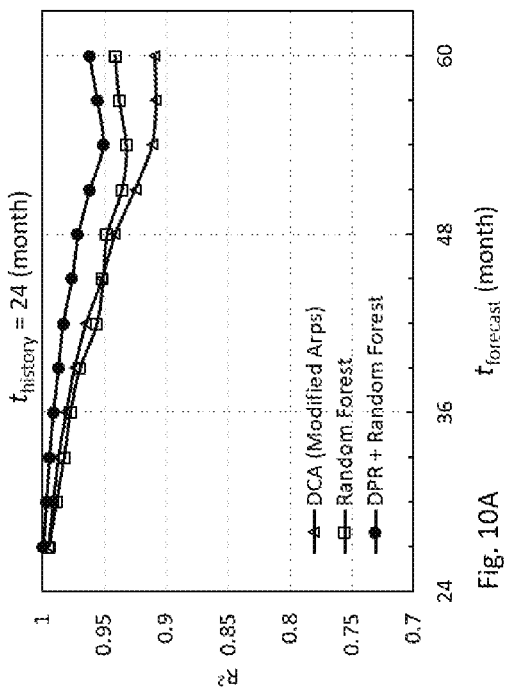
Figure 10C:
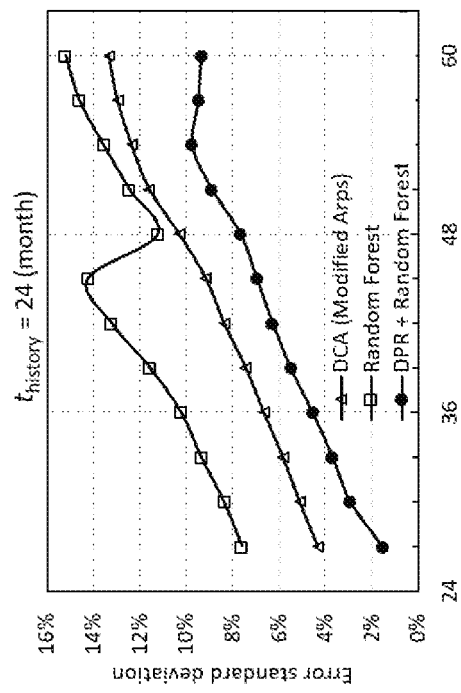
Figure 11A:
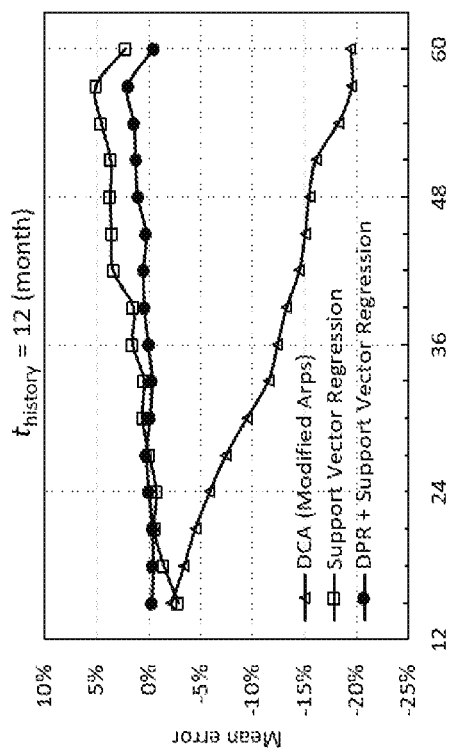
FIGS. 11A-11D illustrate examples that compare three methods on forecast accuracy of gas production in a sand formation subject to 12 months of historical data, using $R^2$, mean error, error standard deviation, and error skewness as accuracy metrics, and Support Vector Regression as the supervised machine learning algorithm.
Figure 11B:
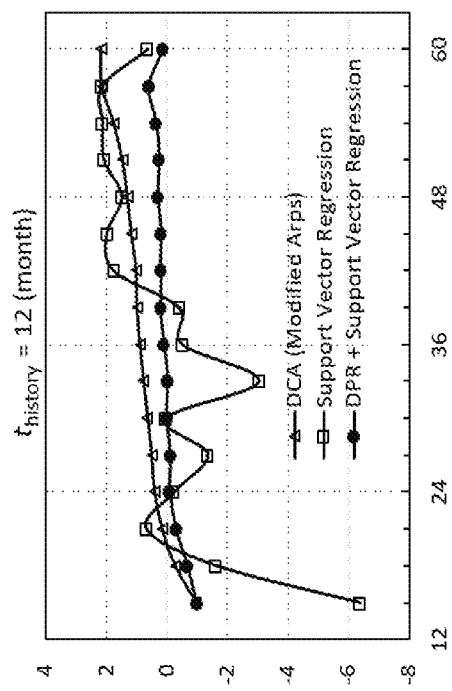
Figure 11C:
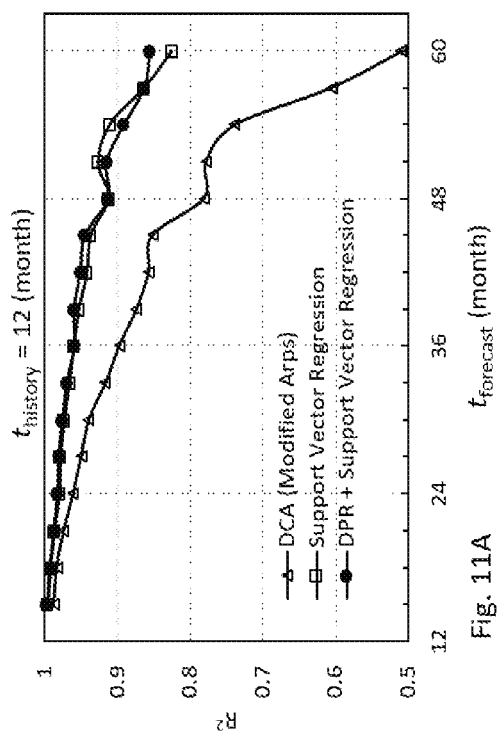
Figure 11D:
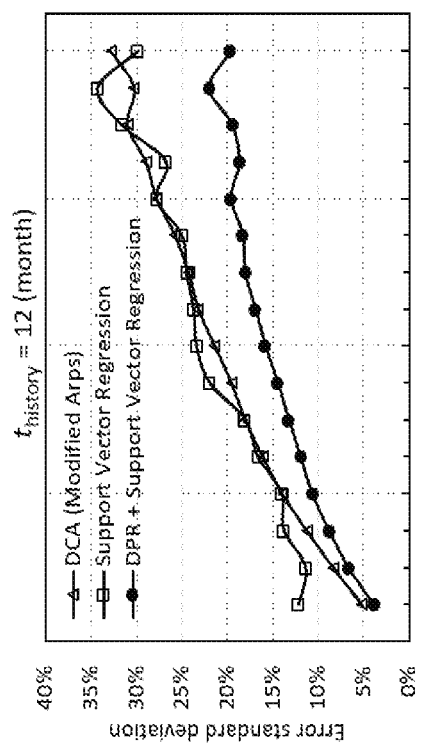

Example_A—FIGS. 6A and 6B illustrate graphically the effect of DPR on the production curves of a set of training wellbore examples. In this example, the target wellbores have 12 months of history, and thus, $t_{history}=12$ (month). The cumulative production curve of each training wellbore is divided by its cumulative production at month 12, such that all the scaled cumulative production curves converge at unity at month 12. If another set of target wellbores has 18 months of history, then the scaled cumulative production curves converge at unity at month 18. Such DPR transformation decomposes the cumulative production into a normalized production trend and a scaling factor that is determined dynamically by $t_{history}$. This allows the production trend to be captured consistently and effectively by a machine learning algorithm (e.g., a supervised machine learning algorithm), which may lead to more accurate production forecasts with small bias, small error standard deviation, and small error skewness.

Example_B—In this example, three production forecast methods were compared with respect to forecast accuracy of oil production in an unconventional formation. The first method is Modified Arps Decline Curve Analysis as in (a) ROBERTSON, S, Generalized Hyperbolic Equation, SPE 18731, 1988 and (b) FEKETE, Traditional Decline Analysis Theory, 2014 each of which is incorporated by reference. The second method is random forest without DPR. The third method is random forest with DPR (e.g., the method 200 in FIG. 2 with the two DPR related steps 225 and 235). Random forest is employed as the supervised machine learning algorithms can also be used, which all be demonstrated in Example_C. Hereinafter, the second method is denoted by RF, and the third method is denoted by DPR-RF. The dataset in this example contained information of 1,400 wellbores in fluidic communication with the unconventional formation.

Decline curve Analysis (DCA) has been applied in production forecast of wellbores in hydrocarbon reservoirs, and many DCA models are available for us such as: (i) Arps, J. J., Analysis of decline curves. Transactions of the AIME, 160(01), pp. 228-247, 1945, (ii) ROBERTSON, S., Generalized Hyperbolic Equation, SPE 18731, 1988 (iii) VALKÓ, P. P., LEE, W. J., A better way to forecast production from unconventional gas wells. In SPE Annual technical conference and exhibition, Society of Petroleum Engineers. SPE 134231, January 2010; (iv) DUONG, A. N., An unconventional, resources and international petroleum conference, Society of Petroleum Engineers, SPE 137748, January 2010; and (v) FEKETE, Traditional Decline Analysis Theory, 2014 each of which is incorporated by reference.

Modified Arps DCA (such as in ROBERTSON, S., Generalized Hyperbolic equation, SPE 18731, 1988 and FEKETE, Traditional Decline Analysis Theory, 2014 each of which is incorporated by reference)) is commonly used for DCA in unconventional formations.

Given a certain length of production history (denoted by $t_{history}$), DCA fits a curve through the historical data based on a certain formula (e.g., Modified Arps formula), and then extrapolates the curve to the future time (denoted by $t_{forecast}$). In this example, the following steps were taken to evaluate the production forecast accuracy of Modified Arps DCA:

1. Choose a $t_{history}$ and a $t_{forecast}$ ($t_{history}$ $t_{forecast}$);
2. For each wellbore in the dataset, pretend that it only has $t_{history}$ length of production history. Fit a curve through the production history using the Modified Arps formula, and extrapolate the curve to time $t_{forecast}$. The predicted cumulative production at $t_{forecast}$ is denoted by $\hat{p}$. The vector $\hat{P}$ contains the $\hat{p}$'s for all the wellbores;
3. For each wellbore in the dataset, compare its $\hat{p}$ with its actual cumulative production at $t_{forecast}$, denoted by p. The vector P contains the p's for all the wellbores. The error is defined by $\epsilon=(\hat{p}-p)/p$. The vector Err contains the errors for all the wellbores;
4. Compute $R^2$ from $\hat{P}$ and P; compute mean error, error standard deviation, and error skewness from Err;
5. Repeat Steps 1 to 4 for different $t_{history}$ and $t_{forecast}$.

In this example, the second method (denoted by RF) and the third method (DPR-RF) both employed a supervised machine learning algorithm (in this example, random forest). Consequently, the three weaknesses of traditional DCA can be avoided. For example, the embodiments discussed herein use a machine learning algorithm that considers the production history of other wellbores in the geologic formation and the wellbores' geographic, geologic, wellbore, completion, and/or surface facility properties, and this allows machine learning to learn from actual well performance responsive to these data rather than fixating on a predetermined formula such as Modified Arps formula. The following steps were taken to blind-test and evaluate their production forecast accuracy:

1. Choose a $t_{history}$ and a $t_{forecast}$ ($t_{history}$ $t_{forecast}$);
2. Randomly select 10% wellbores in the dataset as the hold-out set (or blind-test set), pretend that they only have $t_{history}$ length of production history. Use the remaining 90% wellbores as training wellbores. Apply the production forecast method to learn the training wellbores' data. Use such learning to predict the cumulative production of the hold-out wellbores at time $t_{forecast}$ subject to their $t_{history}$ length of production history;

3. For each wellbore in the hold-out set, compare its predicted cumulative production at $t_{forecast}$ with its actual cumulative production at $t_{forecast}$;
4. Repeat Steps 2 and 3 nine more times, such that each wellbore in the dataset is selected to be a hold-out wellbore once;
5. Compute $R^2$, mean error, error standard deviation, and error skewness;
6. Repeat Steps 1 to 5 for different $t_{history}$ and $t_{forecast}$.

The blind-testing procedure described by Steps 2 to 5 above is the well-known 10-fold cross validation (JAMES, G., WITTEN, D., HASTIE, T., TIBSHIRANI, R., An introduction to statistical learning: with applications in R. Springer, Section 5.1.3, New York, 2013, which is incorporated by reference), which can blind-test and evaluate the accuracy of any method that is based on supervised machine learning.

FIGS. 7A-7D compared the three methods' production forecast accuracy in terms of $R^2$, mean error, error standard deviation, and error skewness, for $t_{history}$=6 (month) and $t_{forecast}$ ranging from 9 to 60 (month). DPR-RF consistently showed the best forecast accuracy in FIGS. 7A-7D, namely, its $R^2$ is significantly higher, and its mean error, error standard deviation, and error skewness are significantly closer to zero than the other two methods (Modified Arps DCA and RF). In some cases, RF (not using DPR) led to even higher error standard deviation and skewness than Modified Arps DCA. Comparing RF and DPR-RF, in FIGS. 7A-7D, the use of DPR drastically reduced the mean error (bias), error standard deviation, and error skewness, indicating that the production trend was captured consistently and effectively, resulting in improved forecast accuracy.

FIGS. 8A-8D compared the three methods' accuracy for $t_{history}$=12 (month) and $t_{forecast}$ ranging from 15 to 60 (month). FIGS. 9A-9D compared the accuracy for $t_{history}$=18 (month) and $t_{forecast}$ ranging from 21 to 60 (month). FIGS. 10A-10D compared the accuracy for $t_{history}$=24 (month) and $t_{forecast}$ ranging from 27 to 60 (month). In all of these FIGS. 8A-8D, 9A-9D, and 10A-10D, DPR-RF consistently demonstrated the best forecast accuracy, indicating its effectiveness and robustness.

Example_C—The previous example (Example_B) forecasts oil production in the unconventional formation and employs random forest as the supervised machine learning algorithm. However, the inventive concepts are not limited to a fixed fluid phase, geologic formation, or machine learning algorithm. In this Example_C, gas production in a sand formation was predicted, and Support Vector Regression (SVR) was employed as the supervised machine learning algorithm. FIGS. 11A-11D compared the production forecast accuracy of three methods—Modified Arps DCA, SVR, and DPR-SVR—in terms of $R^2$, mean error, error standard deviation, and error skewness, for $t_{history}$=12 (month) and $t_{forecast}$ ranging from 15 to 60 (month). In FIGS. 11A-11D, DPR-SVR consistently demonstrated the best forecast accuracy—higher $R^2$ and smaller (closer to zero) mean error, error standard deviation, and error skewness, further indicating its effectiveness and robustness.

While particular embodiments are described above, it will be understood it is not intended to limit the invention to these particular embodiments. On the contrary, the invention includes alternatives, modifications and equivalents that are within the spirit and scope of the appended claims. For example, some embodiments may use only production data (and not use property related data such as completion data, etc.) to generate hydrocarbon production forecasts consistent with the principles of the present invention. As another example, embodiments consistent with this disclosure may be repeated if the end of the first period of time changes, if the target forecast time changes, new data is obtained, some data is changed, or any combination thereof. Furthermore, a target wellbore may later be selected as a training wellbore depending on the length of production data. As another example, a production forecast may be generated for each wellbore in a bucket, such as performing the following example workflow: perform method 200 with wellboresE and H as the target wellbores (both have 18 months of history), then repeat method 200 with wellbore G (19 months of history), then repeat method 200 with wellbore H (17 months of history). Alternatively, if wellbores EFGH have similar length of production history, and to save computational time, 17 months is selected as the first period of time and then run method 200 once on wellbores EFGH.

Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A computer implemented method of forecasting hydrocarbon production, the method comprising:
   obtaining data of at least one target wellbore comprising production data of the at least one target wellbore for a first period of time;
   obtaining data of a plurality of training wellbores comprising production data of the plurality of training wellbores for a second period of time, wherein the second period of time is longer than the first period of time, and wherein the second period of time comprises the first period of time and a target forecast time;
   transforming the production data of the plurality of training wellbores and the production data of the at least one target wellbore such that the production data for all training wellbores and target wellbores are equivalent at the end of the first period of time, wherein the transformation utilizes a dynamic scaling factor responsive to the end of the first period of time;
   generating a transformed production forecast for each target wellbore at the target forecast time responsive to the transformed production data; and
   back transforming the transformed production forecast for each target wellbore to remove the equivalency, wherein the back transformed production forecast for each target wellbore is the final production forecast for each target wellbore.

2. The method of claim 1, wherein transforming the production data of the plurality of training wellbores and the production data of the at least one target wellbore comprises using a dynamic production resealing transformation algorithm.

3. The method of claim 1, wherein generating the transformed production forecast for each target wellbore at the target forecast time responsive to the transformed production data comprises using a machine learning algorithm.

4. The method of claim 3, wherein the machine learning algorithm comprises a supervised machine learning algorithm.

5. The method of claim 3, wherein the machine learning algorithm comprises least-squares regression, random forest, support vector regression, artificial neural network, gradient boosting, or any combination thereof.

6. The method of claim 3, wherein the machine learning algorithm learns relationships between predictor variables and a response variable, and wherein the predictor variables correspond to the transformed production data of the plurality of training wellbores for the first period of time, and wherein the predictor variables further correspond to the transformed production data of the at least one target wellbore for the first period of time, and wherein the response variable corresponds to the transformed production data of the plurality of training wellbores at the target forecast time.

7. The method of claim 6, wherein the predictor variables further correspond to geographic data, geologic data, wellbore data, completion data, surface facility data, or any combination thereof of the plurality of training wellbores, and wherein the predictor variables further correspond to geographic data, geologic data, wellbore data, completion data, surface facility data, or any combination thereof of the at least one target wellbore.

8. The method of claim 1, wherein back transforming the transformed production forecast for each target wellbore comprises using a dynamic production resealing back-transformation algorithm.

9. The method of claim 1:
wherein the data of the at least one target wellbore further comprises geographic data, geologic data, wellbore data, completion data, surface facility data, or any combination thereof; and
wherein the data of the plurality of training wellbores further comprises geographic data, geologic data, wellbore data, completion data, surface facility data, or any combination thereof.

10. The method of claim 1:
wherein down time has been removed from the production data of the at least one target wellbore, ramp up has been removed from the production data of the at least one target wellbore, data preprocessing has been performed on the data of the at least one target wellbore, or any combination thereof; and
wherein down time has been removed from the production data of the plurality of training wellbores, ramp up has been removed from the production data of the plurality of training wellbores, data preprocessing has been performed on the data of the plurality of training wellbores, or any combination thereof.

11. A system of forecasting hydrocarbon production, the system comprising:
a processor; and
a memory communicatively connected to the processor, the memory storing computer-executable instructions which, when executed, cause the processor to perform:
obtaining data of at least one target wellbore comprising production data of the at least one target wellbore for a first period of time;
obtaining data of a plurality of training wellbores comprising production data of the plurality of training wellbores for a second period of time, wherein the second period of time is longer than the first period of time, and wherein the second period of time comprises the first period of time and a target forecast time;
transforming the production data of the plurality of training wellbores and the production data of the at least one target wellbore such that the production data for all training wellbores and target wellbores are equivalent at the end of the first period of time, wherein the transformation utilizes a dynamic scaling factor responsive to the end of the first period of time;
generating a transformed production forecast for each target wellbore at the target forecast time responsive to the transformed production data; and
back transforming the transformed production forecast for each target wellbore to remove the equivalency, wherein the back transformed production forecast for each target wellbore is the final production forecast for each target wellbore.

12. The system of claim 11, wherein the computer-executable instructions, when executed, cause the processor to transform the production data of the plurality of training wellbores and the production data of the at least one target wellbore by using a dynamic production resealing transformation algorithm.

13. The system of claim 11, wherein the computer-executable instructions, when executed, cause the processor to generate the transformed production forecast for each target wellbore at the target forecast time responsive to the transformed production data by using a machine learning algorithm.

14. The system of claim 13, wherein the machine learning algorithm comprises a supervised machine learning algorithm.

15. The system of claim 13, wherein the machine learning algorithm comprises least-squares regression, random forest, support vector regression, artificial neural network, gradient boosting, or any combination thereof.

16. The system of claim 13, wherein the machine learning algorithm learns relationships between predictor variables and a response variable, and wherein the predictor variables correspond to the transformed production data of the plurality of training wellbores for the first period of time, and wherein the predictor variables further correspond to the transformed production data of the at least one target wellbore for the first period of time, and wherein the response variable corresponds to the transformed production data of the plurality of training wellbores at the target forecast time.

17. The system of claim 16:
wherein the predictor variables further correspond to geographic data, geologic data, wellbore data, completion data, surface facility data, or any combination thereof of the plurality of training wellbores; and
wherein the predictor variables further correspond to geographic data, geologic data, wellbore data, completion data, surface facility data, or any combination thereof of the at least one target wellbore.

18. The system of claim 11, wherein the computer-executable instructions, when executed, cause the processor to back transform the transformed production forecast for each target wellbore by using a dynamic production resealing back-transformation algorithm.

19. The system of claim 11:
wherein the data of the at least one target wellbore further comprises geographic data, geologic data, wellbore data, completion data, surface facility data, or any combination thereof; and
wherein the data of the plurality of training wellbores further comprises geographic data, geologic data, wellbore data, completion data, surface facility data, or any combination thereof.

20. The system of claim 11:
wherein down time has been removed from the production data of the at least one target wellbore, ramp up has been removed from the production data of the at least one target wellbore, data preprocessing has been performed on the data of the at least one target wellbore, or any combination thereof; and
wherein down time has been removed from the production data of the plurality of training wellbores, ramp up has been removed from the production data of the plurality of training wellbores, data preprocessing has been performed on the data of the plurality of training wellbores, or any combination thereof.

21. A non-transitory computer readable storage medium having computer-executable instructions stored thereon which, when executed by a computer, cause the computer to perform a method of forecasting hydrocarbon production, the method comprising:
obtaining data of at least one target wellbore comprising production data of the at least one target wellbore for a first period of time;
obtaining data of a plurality of training wellbores comprising production data of the plurality of training wellbores for a second period of time, wherein the second period of time is longer than the first period of time, and wherein the second period of time comprises the first period of time and a target forecast time;
transforming the production data of the plurality of training wellbores and the production data of the at least one target wellbore such that the production data for all training wellbores and target wellbores are equivalent at the end of the first period of time, wherein the transformation utilizes a dynamic scaling factor responsive to the end of the first period of time;
generating a transformed production forecast for each target wellbore at the target forecast time responsive to the transformed production data; and
back transforming the transformed production forecast for each target wellbore to remove the equivalency, wherein the back transformed production forecast for each target wellbore is the final production forecast for each target wellbore.

22. The method of claim 1, wherein the production data of the plurality of training wellbores and the production data of the at least one target wellbore are transformed such that cumulative production data for all training wellbores and target wellbores are equivalent at the end of the first period of time.

23. The system of claim 11; wherein the production data of the plurality of training wellbores and the production data of the at least one target wellbore are transformed such that cumulative production data for all training wellbores and target wellbores are equivalent at the end of the first period of time.

24. The non-transitory computer readable storage medium of claim 21, wherein the production data of the plurality of training wellbores and the production data of the at least one target wellbore are transformed such that cumulative production data for all training wellbores and target wellbores are equivalent at the end of the first period of time.

* * * * *